United States Patent
Xiao

(10) Patent No.: US 12,197,924 B2
(45) Date of Patent: Jan. 14, 2025

(54) APPLICATION STARTING METHOD, ELECTRONIC DEVICE, AND READABLE STORAGE MEDIUM

(71) Applicant: Honor Device Co., Ltd., Shenzhen (CN)

(72) Inventor: Jiwei Xiao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/034,560

(22) PCT Filed: Sep. 6, 2022

(86) PCT No.: PCT/CN2022/117370
§ 371 (c)(1),
(2) Date: Apr. 28, 2023

(87) PCT Pub. No.: WO2023/098202
PCT Pub. Date: Jun. 8, 2023

(65) Prior Publication Data
US 2024/0330012 A1   Oct. 3, 2024

(30) Foreign Application Priority Data
Nov. 30, 2021   (CN) .................... 202111449783.8

(51) Int. Cl.
G06F 9/44    (2018.01)
G06F 9/445   (2018.01)
G06F 9/451   (2018.01)

(52) U.S. Cl.
CPC .......... *G06F 9/44505* (2013.01); *G06F 9/451* (2018.02)

(58) Field of Classification Search
CPC .................................... G06F 1/32; G06F 9/44
See application file for complete search history.

(56) References Cited

U.S. PATENT DOCUMENTS 7,484,220 B2   1/2009   Kelley et al.
9,430,333 B2   8/2016   D'Amato et al.
(Continued)

FOREIGN PATENT DOCUMENTS

CN    1977246 A     6/2007
CN    103019841 A   4/2013
(Continued)

OTHER PUBLICATIONS

Listen to the Truth, "The problem that the Activity is covered by the application snapshot after opening," Retrieved from the Internet, URL: https://blog.csdn.net/zhangying1994/article/details/104030994 (Jan. 18, 2020).

*Primary Examiner* — Keshab R Pandey
(74) *Attorney, Agent, or Firm* — Leydig, Voit & Mayer, Ltd.

(57) ABSTRACT

This application provides an application starting method, an electronic device, and a readable storage medium, and relates to the field of terminal application technologies. The method includes: when an application is switched from a foreground to a background for running, saving a final interface (namely, a first interface) displayed before the application is switched to the background for running as a snapshot; when a user clicks an icon of the application on a system desktop to start the application again, in a case that a process of the application does not end, a first activity corresponding to the first interface is not destroyed, and a new activity needs to be created when the application is started. Therefore, from the user's point of view, the start response speed of application software is improved.

20 Claims, 20 Drawing Sheets

(56) References Cited

U.S. PATENT DOCUMENTS

| | | | |
|---|---|---|---|
| 10,911,540 B1 | 2/2021 | Gunasekaran et al. | |
| 11,150,791 B1 | 10/2021 | Garibaldi et al. | |
| 2012/0311490 A1 | 12/2012 | Ammon et al. | |
| 2013/0227419 A1 | 8/2013 | Lee et al. | |
| 2015/0149907 A1* | 5/2015 | Wu | G06F 3/0484 |
| | | | 715/728 |
| 2018/0088764 A1 | 3/2018 | Lu et al. | |
| 2018/0335939 A1* | 11/2018 | Karunamuni | G06F 9/445 |
| 2019/0369830 A1 | 12/2019 | Alonso Ruiz et al. | |
| 2020/0341598 A1 | 10/2020 | Vora et al. | |
| 2023/0025276 A1 | 1/2023 | Wang | |

FOREIGN PATENT DOCUMENTS

| | | |
|---|---|---|
| CN | 103593254 A | 2/2014 |
| CN | 105144113 A | 12/2015 |
| CN | 107748686 A | 3/2018 |
| CN | 107832113 A | 3/2018 |
| CN | 109947317 A | 6/2019 |
| CN | 110007981 A | 7/2019 |
| CN | 110096329 A | 8/2019 |
| CN | 111435299 A | 7/2020 |
| CN | 111459381 A | 7/2020 |
| CN | 112114808 A | 12/2020 |
| CN | 112860145 A | 5/2021 |
| CN | 113268286 A | 8/2021 |
| CN | 114327179 A | 4/2022 |

\* cited by examiner

TO FIG. 3B

CONT. FROM
FIG. 3A
Interface 1 corresponding to the Activity 1
Use the interface 1 corresponding to the Activity 1 as a snapshot
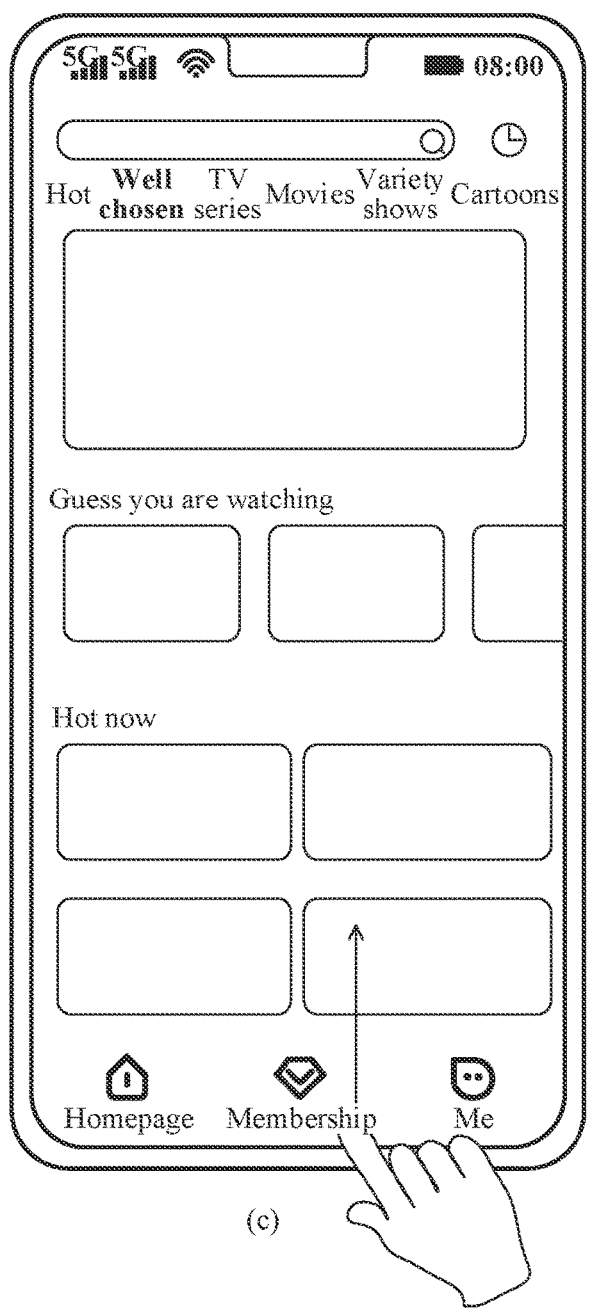
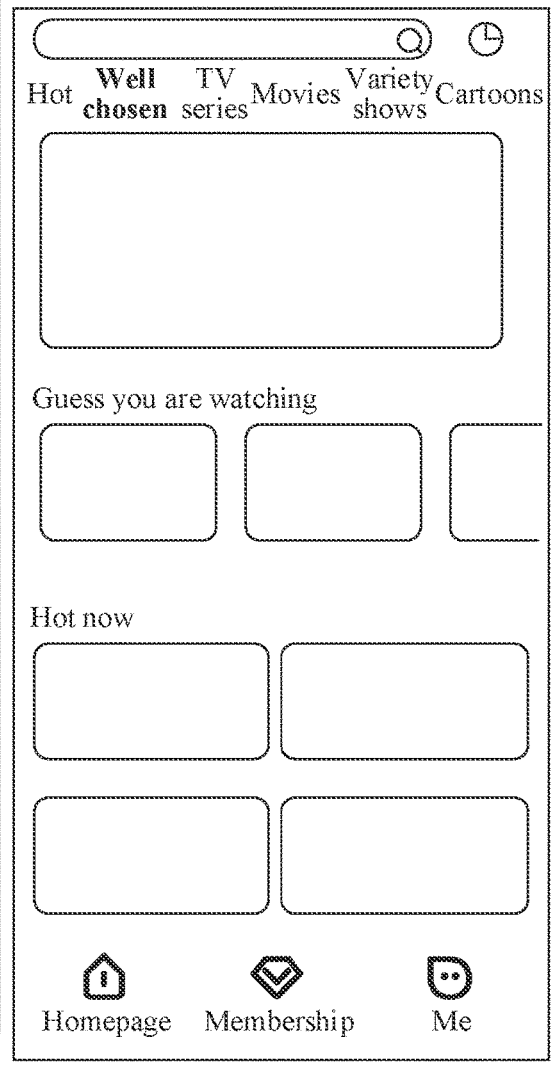
(c)
(d)
TO FIG. 3C
FIG. 3B

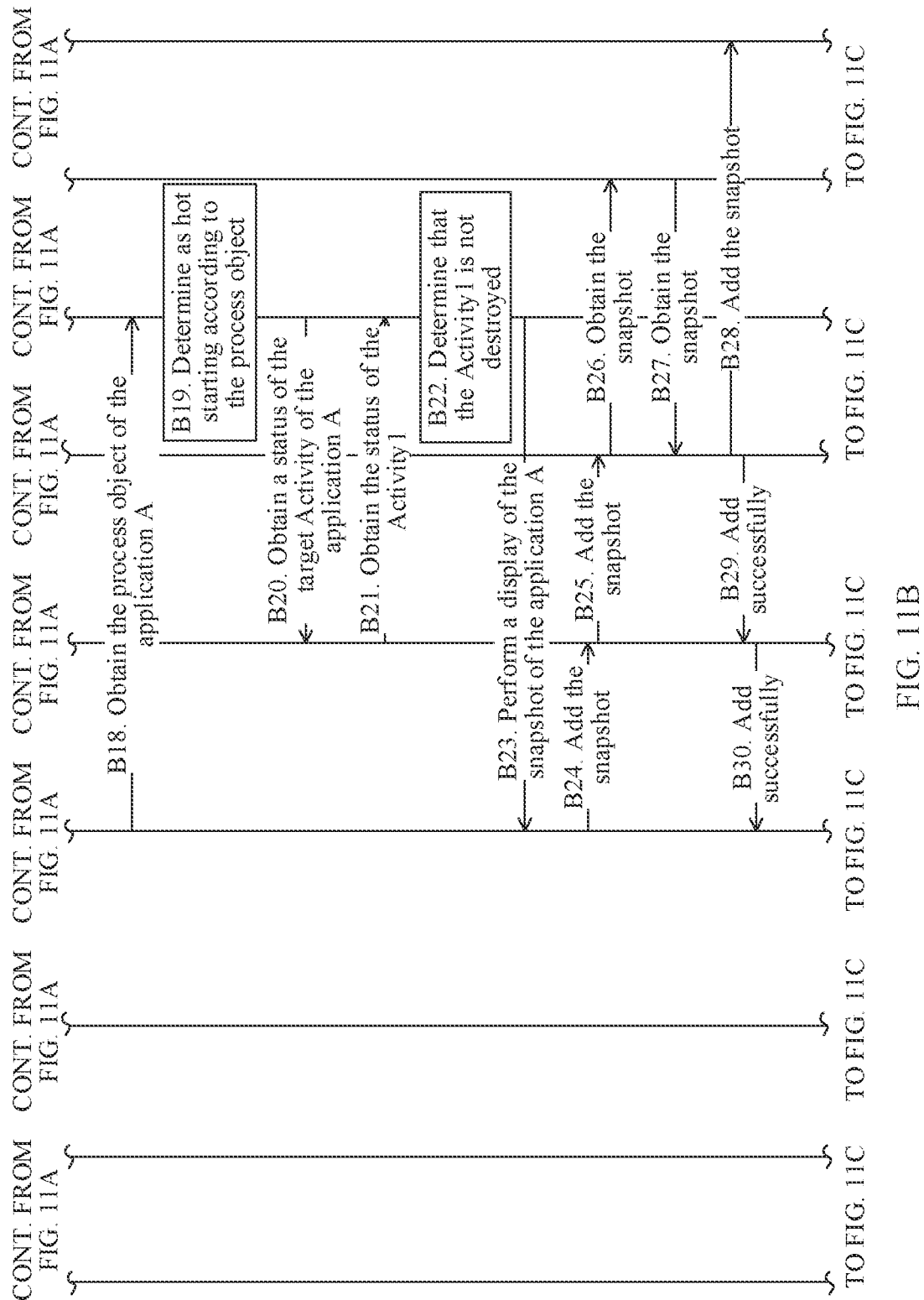

APPLICATION STARTING METHOD, ELECTRONIC DEVICE, AND READABLE STORAGE MEDIUM

CROSS-REFERENCE TO RELATED APPLICATIONS

This application is a national stage of International Application No. PCT/CN2022/117370, filed on Sep. 6, 2022, which claims priority to Chinese Patent Application No. 202111449783.8, filed on Nov. 30, 2021. The disclosures of both of the aforementioned applications are hereby incorporated by reference in their entireties.

TECHNICAL FIELD

This application relates to the field of terminal application, and in particular, to an application starting method, an electronic device, and readable storage medium.

BACKGROUND

As electronic devices become more and more intelligent, more and more application software is installed and run in the electronic devices. When a user uses a service provided by one application software, the user needs to perform an operation to start the application software. For example, the user clicks an icon of the application software on a system desktop of an electronic device, and the electronic device can start the application software to display an interface provided by the application software.

When the electronic device starts the application software, an internal system of the electronic device needs to perform processing to obtain the interface of the application software. Therefore, after the user's operation ends, the electronic device may delay for a period of time before displaying the interface of the application software. At present, the time from the end of the user's operation to the electronic device displaying the interface of the application software is relatively long, and from the user's point of view, the start response speed of the application is relatively slow.

SUMMARY

This application provides an application starting method, an electronic device, and a readable storage medium, which can improve the start response speed of application software.

To achieve the foregoing objective, the following technical solutions are used in this application:

According to a first aspect, this application provides an application starting method, including:
  displaying, by the electronic device, a first interface of a first application;
  receiving, by the electronic device, a first operation inputted by a user;
  switching, by the electronic device in response to the first operation, the first application to a background for running;
  receiving, by the electronic device, a second operation inputted by the user;
  starting, by the electronic device, the first application in response to the second operation;
  in a process of starting the first application, in a case that the first application meets a preset condition, displaying, by the electronic device, a first image, where the first image is related to the first interface, and the preset condition includes the following: a process of the first application does not end, a first activity corresponding to the first interface is not destroyed, and a second activity needs to be created in a case that the first application is started; and
  displaying, by the electronic device, the first interface after the electronic device resumes the first activity.

When an application needs to create a new activity, a snapshot of the application is displayed first. During the display of the snapshot of the application, an internal system creates the new activity and resumes a target activity (an activity that corresponds to an interface displayed before the application returns to a background previously, and is not destroyed), to obtain an interface corresponding to the target activity. Because the activity corresponding to the interface displayed before the application returns to the background previously is the same as an activity resumed after the application is started, the snapshot displayed by the application is the same as content of a first interface displayed after the application is started. From a user's point of view, the start response speed of application software is improved.

As an implementation of the first aspect of this application, after the receiving, by the electronic device, a first operation inputted by a user, the method further includes:
  obtaining, by the electronic device, a second image based on the first interface; and
  caching, by the electronic device, the second image, where the second image includes the first image.

In this application, the first image is the first interface of the first application, and the cached second image may be an image of the first interface of the first application, or may be the image of the first interface of the first application and an image of a status bar.

As an implementation of the first aspect of this application, before the displaying, by the electronic device, a first image, the method further includes:
  determining, by the electronic device, that the process of the first application does not end;
  determining, by the electronic device, that the first activity corresponding to the first interface is not destroyed; and
  determining, by the electronic device, that the second activity needs to be created in a case that the first application is started.

As an implementation of the first aspect of this application, the electronic device includes a logic determination component and an activity task management component, and the activity task management component is configured to record a status of a process of an application; and the determining, by the electronic device, that the process of the first application does not end includes:
  obtaining, by the logic determination component, a status of the process of the first application from the activity task management component; and
  determining, by the logic determination component according to the status of the process of the first application, that the process of the first application does not end.

As an implementation of the first aspect of this application, the electronic device includes a logic determination component and an activity recording component, and the activity recording component is configured to record a status of an activity; and the determining, by the electronic device, that the first activity corresponding to the first interface is not destroyed includes:
  obtaining, by the logic determination component, a status of the first activity from the activity recording component; and determining, by the logic determination component according to the status of the first activity, that the first activity is not destroyed.

As an implementation of the first aspect of this application, the electronic device includes the activity task management component, the activity task management component is configured to send start information of the first application to the logic determination component in a case that the first application is started, and the start information of the first application includes a target activity in a case that the first application is started; and before the obtaining, by the logic determination component, a status of the first activity from the activity recording component, the method further includes:

receiving, by the logic determination component, the start information of the first application sent by the activity task management component; and determining, by the logic determination component according to the start information of the first application, that the target activity is the first activity in a case that the first application is started.

As an implementation of the first aspect of this application, the electronic device includes the logic determination component and the activity task management component, the activity task management component is configured to send the start information of the first application to the logic determination component in a case that the first application is started, and the start information of the first application includes creating the second activity; before the determining, by the electronic device, that the second activity needs to be created in a case that the first application is started, the method further includes:

receiving, by the logic determination component, the start information of the first application sent by the activity task management component; and the determining, by the electronic device, that the second activity needs to be created in a case that the first application is started includes: determining, by the logic determination component according to the start information of the first application, that the second activity needs to be created in a case that the first application is started.

As an implementation of the first aspect of this application, the electronic device further includes: a desktop launcher; the receiving, by the electronic device, a second operation inputted by the user is specifically: receiving, by the desktop launcher, the second operation inputted by the user; and the method further includes:

sending, by the desktop launcher in response to the second operation, a start instruction of the first application to the activity task management component;

obtaining, by the activity task management component in response to receiving the start instruction, the start information of the first application; and sending, by the activity task management component, the start information of the first application to the logic determination component.

As an implementation of the first aspect of this application, the electronic device includes: an activity task management component, a logic determination component, a snapshot module, and a WMS; the caching, by the electronic device, the second image includes: caching, by the snapshot module, the second image; and the in a case that the first application meets a preset condition, displaying, by the electronic device, a first image includes: in a case that the logic determination component determines that the first application meets the preset condition, sending, by the logic determination component, first information to the activity task management component, where the first information is used for indicating that the first application meets the preset condition; in a case that the first information is received, sending, by the activity task management component, second information to the snapshot module, where the second information is used for instructing the snapshot module to send the second image to the WMS; sending, by the snapshot module, the second image to the WMS; and controlling, by the WMS, the electronic device to display the first image based on the second image.

As an implementation of the first aspect of this application, the electronic device includes: an activity recording component; and the sending, by the activity task management component, second information to the snapshot module includes: sending, by the activity task management component, the second information to the snapshot module by using the activity recording component.

As an implementation of the first aspect of this application, the first image is same as the second image, and the first image is same as an image of the first interface; or, the first image is same as the image of the first interface, the second image includes the image of the first interface and first status bar content, and the first status bar content is status bar content of the electronic device in a case that the electronic device caches the second image.

In this application, a snapshot of the application saved before the application returns to the background is recorded as the second image. In this embodiment of this application, a snapshot displayed when the application is started again is recorded as the first image. The saved snapshot (the second image) includes the first interface of the first application, and may include the status bar (status bar content at a moment of taking a screenshot) or may not include the status bar. The displayed snapshot (the first image) is an image that includes the first interface of the first application and does not include the status bar content. When the electronic device displays the first image, in a case that the second image does not include the status bar (the status bar content at the moment of taking a screenshot), the saved second image and the current status bar content need to be synthesized; and in a case that the second image includes the status bar (the status bar content at the moment of taking a screenshot), the current status bar content of a system covers a region of the status bar of the second image; or screenshot processing is performed on the second image to obtain the first image that includes the first interface of the first application and does not include the status bar content, and then when the electronic device displays the first image, the first image and the status bar content are synthesized.

As an implementation of the first aspect of this application, after the sending, by the snapshot module, the second image to the WMS, the method further includes:

sending, by the snapshot module, information that the second image is successfully added to the activity task management component; and in response to receiving the information that the second image is successfully added, sending, by the activity task management component, a first instruction to the WMS by using the snapshot module, where the first instruction is used for instructing the WMS to control the electronic device to display the first image based on the second image.

As an implementation of the first aspect of this application, the electronic device includes an activity recording component; and the sending, by the snapshot module, information that the second image is successfully added to the activity task management component includes: sending, by the snapshot module, the information that the second image is successfully added to the activity task management component by using the activity recording component.

As an implementation of the first aspect of this application, the second operation is an operation acting on an icon of the first application displayed on a system desktop of the electronic device, and the electronic device further includes a desktop launcher; and after the sending, by the activity task management component, a first instruction to the WMS by using the snapshot module, the method further includes: sending, by the activity task management component, third information to the desktop launcher, where the third information is used for instructing the desktop launcher to stop displaying the system desktop.

As an implementation of the first aspect of this application, the caching, by the snapshot module, the second image includes:

caching, by the snapshot module, the second image in a snapshot cache file; and correspondingly, the sending, by the snapshot module, the second image to the WMS includes:

obtaining, by the snapshot module, the second image from the snapshot cache file; and sending, by the snapshot module, the second image to the WMS.

As an implementation of the first aspect of this application, before the receiving, by the electronic device, a second operation inputted by the user, the method further includes:

receiving, by the electronic device, a third operation inputted by the user; and starting, by the electronic device, a second application in response to the third operation, and displaying a second interface of the second application.

After the first application returns to the background for running, the user may perform another operation on the electronic device, for example, may start the second application through the third operation; and may also enable the second application to return to the background again, so that the electronic device displays the system desktop. Certainly, after the first application returns to the background, the user may return to the system desktop after starting a plurality of applications. Alternatively, the electronic device starts the first application through another application in response of not returning to the system desktop.

As an implementation of the first aspect of this application, before the electronic device resumes the first activity, the method further includes: creating, by the electronic device, the second activity.

As an implementation of the first aspect of this application, the first operation includes: a gesture operation on a touch screen of the electronic device; or an air gesture operation within a field of view of a camera of the electronic device.

In this application, the first operation is any operation of switching the first application from a foreground running to the background for running when the electronic device displays the first interface of the first application.

According to a second aspect, an electronic device is provided, including a processor, the processor being configured to run a computer program stored in a memory, to implement the method according to any one of descriptions of the first aspect of this application.

According to a third aspect, a chip system is provided, including a processor, the processor being coupled to a memory, and the processor being configured to run a computer program stored in the memory, to implement the method according to any one of descriptions of the first aspect of this application.

According to a fourth aspect, a computer-readable storage medium is provided, storing a computer program, the computer program, when executed by one or more processors, implementing the method according to any one of descriptions of the first aspect of this application.

According to a fifth aspect, this application provides a computer program product, the computer program product, when run on a device, causing the device to perform the method according to any one of descriptions of the first aspect of this application.

It may be understood that, for beneficial effects of the second aspect to the fifth aspect, reference may be made to the relevant description in the first aspect, and details are not described herein again.

BRIEF DESCRIPTION OF DRAWINGS

FIG. 3A to FIG. 3C are a schematic diagram of an interface when an application is started according to an embodiment of this application;

FIG. 11A to FIG. 11C are a time-sequence diagram of an application starting method according to an embodiment of this application;

DESCRIPTION OF EMBODIMENTS

In the following description, for the purpose of illustration rather than limitation, specific details such as the specific system structure and technology are proposed to thoroughly understand the embodiments of this application. However, a person skilled in the art should know that this application may be practiced in other embodiments without these specific details.

It should be understood that when used in this specification and the appended claims of this application, the terms "include" indicate the presence of described features, wholes, steps, operations, elements and/or components, but do not exclude the presence or addition of one or more other features, wholes, steps, operations, elements, components and/or a set thereof.

It should be further understood that, in the embodiments of this application, "one or more" mean one, two, or more than two; and the term "and/or" describes an association relationship for describing associated objects and represents that three relationships may exist. For example, A and/or B may represent the following three cases: Only A exists, both A and B exist, and only B exists, where A and B each may be in a singular or plural form. The character "/" generally indicates an "or" relationship between the associated objects.

In addition, in this specification and the appended claims of this application, the terms such as "first", "second", "third", and "fourth" are used only to distinguish descriptions, and should not be understood as indicating or implying relative importance.

The reference to "one embodiment" or "some embodiments" described in this specification of this application means that a specific characteristic, structure or feature described in combination with this embodiment is included in one or more embodiments of this application. Therefore, the statements "in one embodiment", "in some embodiments", "in some other embodiments", "in other embodiments", and the like in the differences in this specification do not necessarily refer to the same embodiment, but mean that "one or more but not all embodiments", unless otherwise specially emphasized in other ways. The terms "include", "comprise", "have" and their variations mean "including but not limited to", unless otherwise specially emphasized in other ways.

An application starting method provided in an embodiment of this application is applicable to an electronic device. The electronic device may be a tablet computer, a mobile phone, a wearable device, a notebook computer, an ultra-mobile personal computer (UMPC), a netbook, a personal digital assistant (PDA), or another electronic device. A specific type of the electronic device is not limited in this embodiment of this application.

Figure 1:
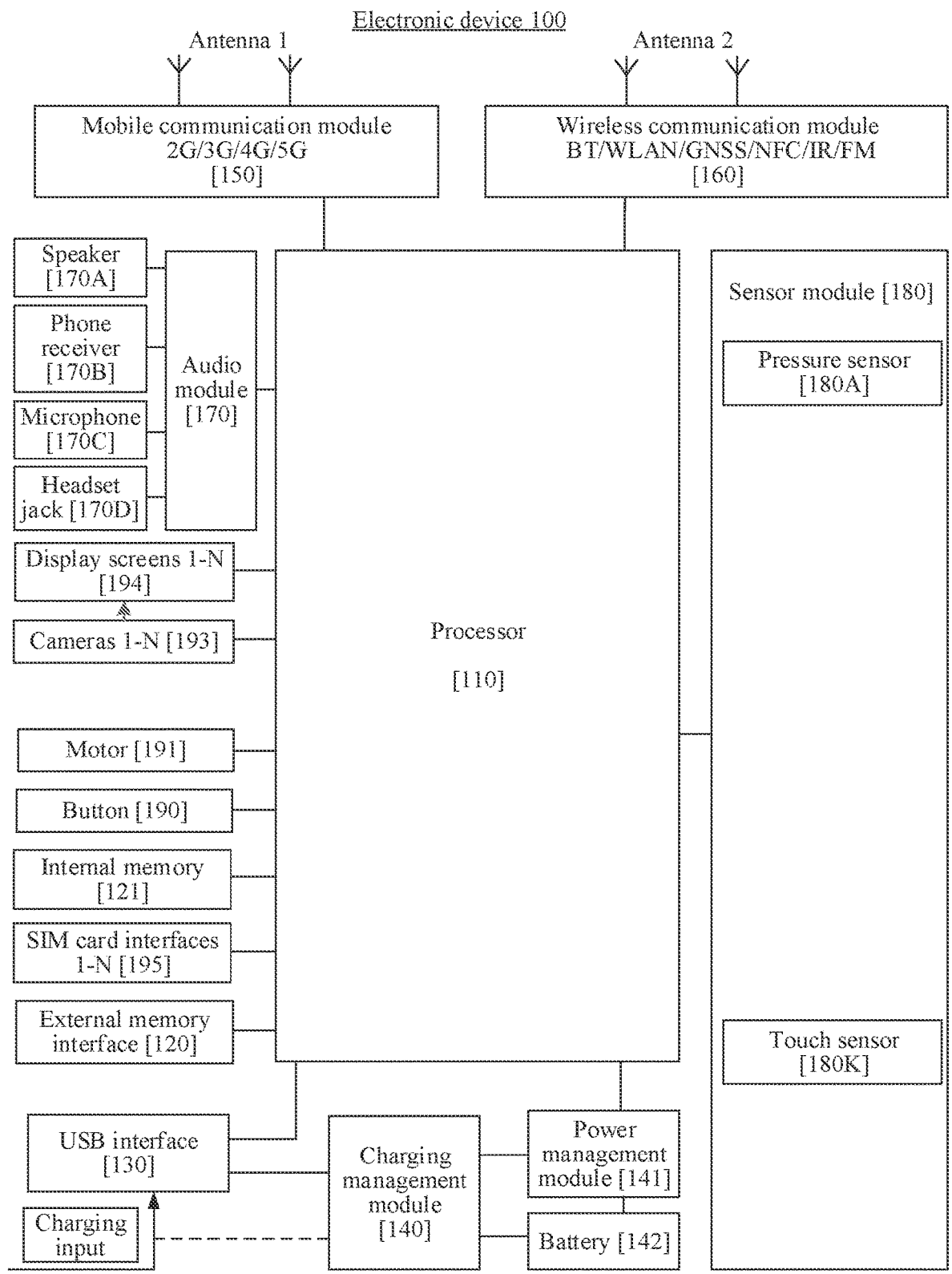
FIG. 1 is a schematic diagram of a hardware structure of an electronic device according to an embodiment of this application.

FIG. 1 is a schematic structural diagram of an electronic device. An electronic device 100 may include a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a button 190, a motor 191, a camera 193, a display screen 194, a subscriber identity module (SIM) card interface 195, and the like. The sensor module 180 may include a pressure sensor 180A, a touch sensor 180K, and the like.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. For example, the processor 110 is configured to perform the application starting method in this embodiment of this application.

The controller may be a nerve center and a command center of the electronic device 100. The controller may generate an operation control signal according to instruction operation code and a time-sequence signal, and control obtaining and executing of instructions.

A memory may also be disposed in the processor 110, configured to store instructions and data. In some embodiments, the memory in the processor 110 is a cache memory. The memory may store an instruction or data that is just used or used cyclically by the processor 110. If the processor 110 needs to use the instruction or the data again, the processor may directly invoke the instruction or the data from the memory, which avoids repeated access, and reduces a waiting time of the processor 110, thereby improving system efficiency.

The USB interface 130 is an interface that complies with the USB standard specification, and may be specifically a Mini USB interface, a Micro USB interface, a USB Type C interface, and the like. The USB interface 130 may be configured to be connected to the charger to charge the electronic device 100, or may be used for data transmission between the electronic device 100 and a peripheral device.

The external memory interface 120 may be configured to be connected to an external storage card such as a micro SD card, to expand a storage capability of the electronic device 100. The external storage card communicates with the processor 110 by using the external memory interface 120, so as to implement a data storage function, for example, storing a file such as a music or a video in the external storage card.

The internal memory 121 may be configured to store computer executable program code, where the executable program code includes an instruction. The processor 110 runs the instruction stored in the internal memory 121, to implement various functional applications and data processing of the electronic device 100. The internal memory 121 may include a program storage region and a data storage region. The program storage region may store an operating system, an application required by at least one function (such as a voice playing function and an image playing function), and the like.

In addition, the internal memory 121 may include a high-speed random access memory, and may also include a non-volatile memory, for example, at least one magnetic disk storage device, a flash memory device, a universal flash storage (UFS), or the like.

The charging management module 140 is configured to receive a charging input from a charger. The charger may be a wireless charger, or may be a wired charger. In some embodiments of wired charging, the charging management module 140 may receive charging input of the wired charger through the USB interface 130.

The power management module 141 is configured to be connected to the battery 142, the charging management module 140, and the processor 110. The power management module 141 receives an input of the battery 142 and/or the charging management module 140, to supply power to the processor 110, the internal memory 121, an external memory, a display screen 194, the camera 193, the wireless communication module 160, and the like.

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna of the electronic device 100 may be configured to cover one or more communication frequency bands. Different antennas may also be multiplexed to improve utilization of the antennas. For example, the antenna 1 may be multiplexed into a diversity antenna of a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation.

The wireless communication module 160 may provide a solution for wireless communication including a wireless local area network (WLAN) (such as a wireless fidelity (Wi-Fi) network), Bluetooth (BT), and a global navigation satellite system (GNSS), frequency modulation (FM), a near field communication (NFC) technology, an infrared (IR) technology, and the like to be applied to the electronic device 100. The wireless communication module 160 may be one or more devices that integrate at least one communication processing module. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology.

The electronic device 100 may implement an audio function, for example, music playback or recording, by using the audio module 170, the speaker 170A, the phone receiver 170B, the microphone 170C, the headset jack 170D, the application processor, and the like.

The audio module 170 is configured to convert a digital audio signal into analog audio signal output, and is also configured to convert analog audio input into a digital audio signal. The audio module 170 may further be configured to encode and decode audio signals. In some embodiments, the audio module 170 may be disposed in the processor 110, or some function modules in the audio module 170 are disposed in the processor 110.

The speaker 170A, also referred to as a "speaker", is configured to convert an audio electrical signal into a sound signal. Music may be listened to or a hands-free call may be answered by using the speaker 170A in the electronic device 100.

The phone receiver 170B, also referred to as a "receiver", is configured to convert an audio electrical signal into a sound signal. When the electronic device 100 is configured to answer a call or receive voice information, the phone receiver 170B may be put close to a human ear to receive a voice.

The microphone 170C, also referred to as a "mic" and a "mike", is configured to convert a sound signal into an electrical signal. When making a call or sending voice information, a user can make a sound near the microphone 170C through the mouth of the user to input a sound signal to the microphone 170C. At least one microphone 170C may be disposed in the electronic device 100. In some other embodiments, two microphones 170C may be disposed in the electronic device 100, to listen to the voice information and implement a noise reduction function. In some other embodiments, three, four, or more microphones 170C may be alternatively disposed in the electronic device 100, to acquire a sound signal, implement noise reduction, recognize a sound source, implement a directional recording function, and the like.

The headset jack 170D is configured to be connected to a wired headset. The headset jack 170D may be a USB interface 130, or may be a 3.5 mm open mobile electronic device platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may be a parallel plate including at least two conductive materials. When a force is applied to the pressure sensor 180A, capacitance between electrodes changes. The electronic device 100 determines pressure strength according to a change in the capacitance. When a touch operation is performed on the display screen 194, the electronic device 100 detects strength of the touch operation according to the pressure sensor 180A. The electronic device 100 may further calculate a position of the touch according to a detection signal of the pressure sensor 180A.

The touch sensor 180K is also referred to as a "touch panel". The touch sensor 180K may be disposed in the display screen 194, and the touch sensor 180K and the display screen 194 constitute a "touch screen". The touch sensor 180K is configured to detect a touch operation on or near the touch sensor 180K. The touch sensor may transfer the detected touch operation to the application processor to determine a type of the touch event. Visual output related to the touch operation may be provided by using the display screen 194. In some other embodiments, the touch sensor 180K may alternatively be disposed on a surface of the electronic device 100, and is located on a position different from that of the display screen 194.

The button 190 includes a power button, a volume button, and the like. The button 190 may be a mechanical button, or a touch-type button. The electronic device 100 may receive a button input, and generate a button signal input related to user setting and function control of the electronic device 100.

The motor 191 may generate a vibration prompt. The motor 191 may be used for an incoming call vibration prompt and a touch vibration feedback.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, or the like. In some embodiments, the electronic device 100 may include 1 or N display screens 194, and N is a positive integer greater than 1.

The camera 193 is configured to capture a still image or a video. In some embodiments, the electronic device 100 may include 1 or N cameras 193, and N is a positive integer greater than 1.

The SIM card interface 195 is configured to connect to a SIM card. The SIM card may be inserted into the SIM card interface 195 or plugged from the SIM card interface 195, to come into contact with or be separated from the electronic device 100. The electronic device 100 may support one or N SIM card interfaces, and N is a positive integer greater than 1.

The embodiments of this application do not specifically limit a specific structure of an execution entity of an application starting method, as long as code in which the application starting method provided in the embodiments of this application is recorded can be run to perform processing according to the application starting method provided in the embodiments of this application. For example, the execution entity of the application starting method provided in the embodiments of this application may be a functional module in an electronic device that can invoke a program and execute the program, or a processing apparatus applied to the electronic device, such as a chip.

The electronic device shown in FIG. 1 may install and run an application. When the electronic device runs an application A (any application installed in the electronic device) in a foreground, the display screen of the electronic device displays an interface of the application A, and a user of the electronic device may perform an interaction operation with the interface of the application A currently displayed on the display screen of the electronic device. When the electronic device runs the application A in a background, the electronic device no longer displays the interface of the application A, and the user of the electronic device cannot perform the interaction operation with the interface of the application A; and certainly, the application A may receive other information (for example, an instant messaging application may receive messages from other users) and notify the user of the other information in a process of running in the background.

In a process in which the user uses the electronic device, if the application A does not run (either in the background or in the foreground), the user starts the application A through an icon of the application A on a desktop of the electronic device, and the electronic device first creates a process for the application. In a case that the process of the application A has been successfully created, an Activity of the application A (such as an Activity1) is run through the process, the Activity1 enters a task stack and is located at the top of the task stack, and the electronic device displays an interface 1 corresponding to the Activity1. The user may perform an interaction operation with the interface 1 corresponding to the Activity1. If the interaction operation causes the electronic device to display another new interface, the process of the application A in a system runs another new Activity (such as an Activity2), the Activity2 enters the task stack and is located at the top of the task stack, and the old Activity1 is pushed to the bottom of the task stack. Correspondingly, the display screen of the electronic device displays an interface 2 corresponding to the Activity2, and the interface of the old Activity1 is destroyed. Certainly, the user may perform an interaction operation (such as a return operation) on the interface 2 corresponding to the Activity2, so that the Activity1 in the task stack returns to the top of the task stack. Then, the Activity2 is destroyed, and correspondingly, the display screen of the electronic device displays the interface 1 corresponding to the Activity1 located at the top of the task stack.

It may be understood from the above description that, each interface displayed by the application depends on each Activity run by the process of the application. In addition, after the application enters the background from the foreground for running, the process of the application may still exist in the system (for example, the process of the application does not die). Certainly, after the application enters the background from the foreground for running, the process of the application may also be destroyed, that is, the process of the application does not exist in the background of the system.

When the application A is started, if the process of the application A does not exist in the background of the system of the electronic device, the system needs to create a new process for the application A, and records the start process as cold starting.

When the application A is started, if the process of the application A exists in the background of the system of the electronic device, the system does not need to create the process for the application A, and records the start process as hot starting.

Figure 2:
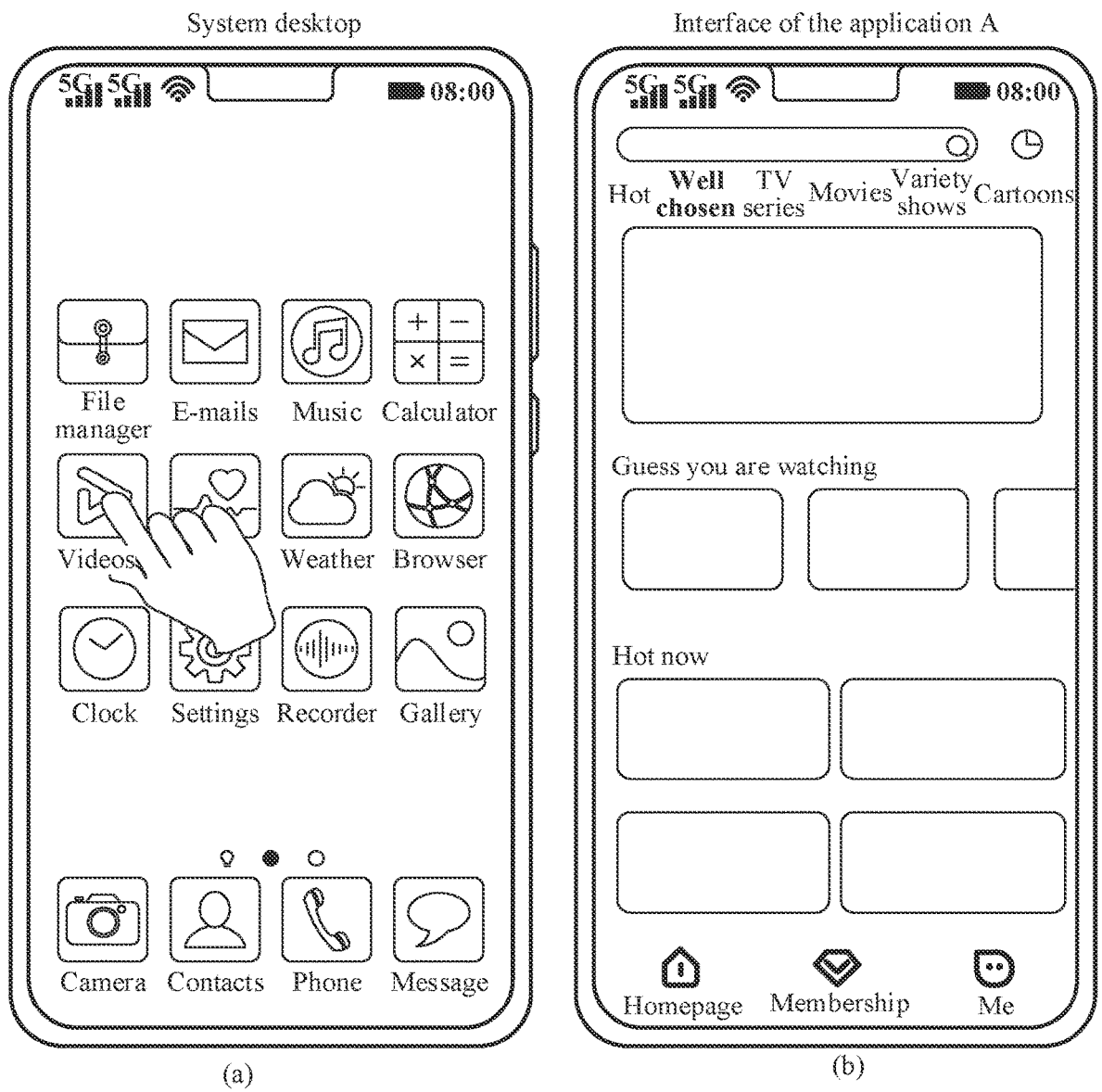
FIG. 2 is a schematic diagram of representing an application response duration when an application is started according to an embodiment of this application.

This embodiment of this application may be applied to a scenario of hot starting of an application. FIG. 2 is an application scenario according to an embodiment of this application. Referring to (a) of FIG. 2, an electronic device displays a system desktop, and a user clicks an icon (such as a video icon) of an application A on the system desktop of the electronic device. Exemplarily, when the electronic device displays the system desktop displayed in (a) of FIG. 2, a process of the application A exists in a background of a system. After a period of time after the user clicks the icon of the application A, the electronic device displays an interface of the application A, referring to (b) of FIG. 2. This embodiment of this application is used for improving a response speed of the electronic device from a click operation shown in (a) of FIG. 2 to the display of the interface of the application A corresponding to (b) of FIG. 2. In this embodiment of this application, the interface corresponding to (b) of FIG. 2 is a final interface displayed when the application A returns from a foreground to the background for running previously.

Certainly, in actual applications, other interfaces may also be displayed between the interface corresponding to (a) of FIG. 2 (an interface corresponding to the system desktop) and the interface of the application A corresponding to (b) of FIG. 2, for example, an advertisement interface when the application A is started. An animation effect may also be displayed in the middle, for example, an animation corresponding to a process in which the icon of the application A is changed from a color icon to a grayscale icon and then changed to the color icon.

Certainly, in actual applications, alternatively, other interfaces may not be displayed between the interface corresponding to (a) of FIG. 2 and the interface corresponding to (b) of FIG. 2, for example, after the user clicks the icon of the application A, the interface corresponding to (a) of FIG. 2 stays for a period of time, until the interface corresponding to (b) of FIG. 2 is displayed.

In this embodiment of this application, a final interface displayed before the electronic device changes from the foreground to the background for running may be recorded as an interface A. After the electronic device enters the background for running, the user may click the icon (referring to (a) of FIG. 2) of the application A on the desktop to switch the application A to the foreground for running. In the scenario of hot starting, before the application A runs from the foreground to the background, although the process of the application A is not destroyed, the interface A has been destroyed. After the click operation on the icon of the application A is detected, the electronic device needs to draw the interface A again by using the process of the application A. If a load of the system of the electronic device is heavier, or the interface A is more complicated, or a memory of the electronic device has been swapped out (for example, some pieces of data under the process of the application A has been swapped from the memory to a disk to save), a time required for the electronic device to draw the interface A is longer, resulting in a relatively slow response speed and affecting the user experience.

In this embodiment of this application, when an application is switched to the background, a snapshot applied to saving a final interface displayed before the application is switched to the background may be set. Snapshots in this embodiment of this application each represent a snapshot of a final interface displayed before the application is switched to the background previously. In response of hot starting of the application (when the application enters the foreground from the background for running, the process of the application is not terminated), the snapshot of the final interface displayed before the application is switched to the background is first displayed, and an Activity at the top of the task stack when the application is switched to the background is resumed (resume) to obtain an interface corresponding to the Activity, and then the obtained interface is displayed. Usually, the interface corresponding to the Activity at the top of the task stack when the application is switched to the background is the final interface displayed before the application is switched to the background.

To have a clearer understanding of the above examples, a display logic diagram of the snapshot when the application is started is first described with reference to FIG. 3A to FIG. 3C to FIG. 9.

FIG. 3A to FIG. 3C to FIG. 4 are an application scenario according to an embodiment of this application. In (a) of FIG. 3A to FIG. 3C, an electronic device displays a system desktop, and a user clicks an icon of an application A (such as a video application) on the system desktop. In this case, a process of the application A does not exist in a background of a system, that is, the application A is cold-started.

In a process of cold starting of the application A, the system first creates the process of the application A for the application A. After the process is created for the application A, the process of the application A starts a host Activity of the application A and draws an interface corresponding to the host Activity.

Figure 3A:
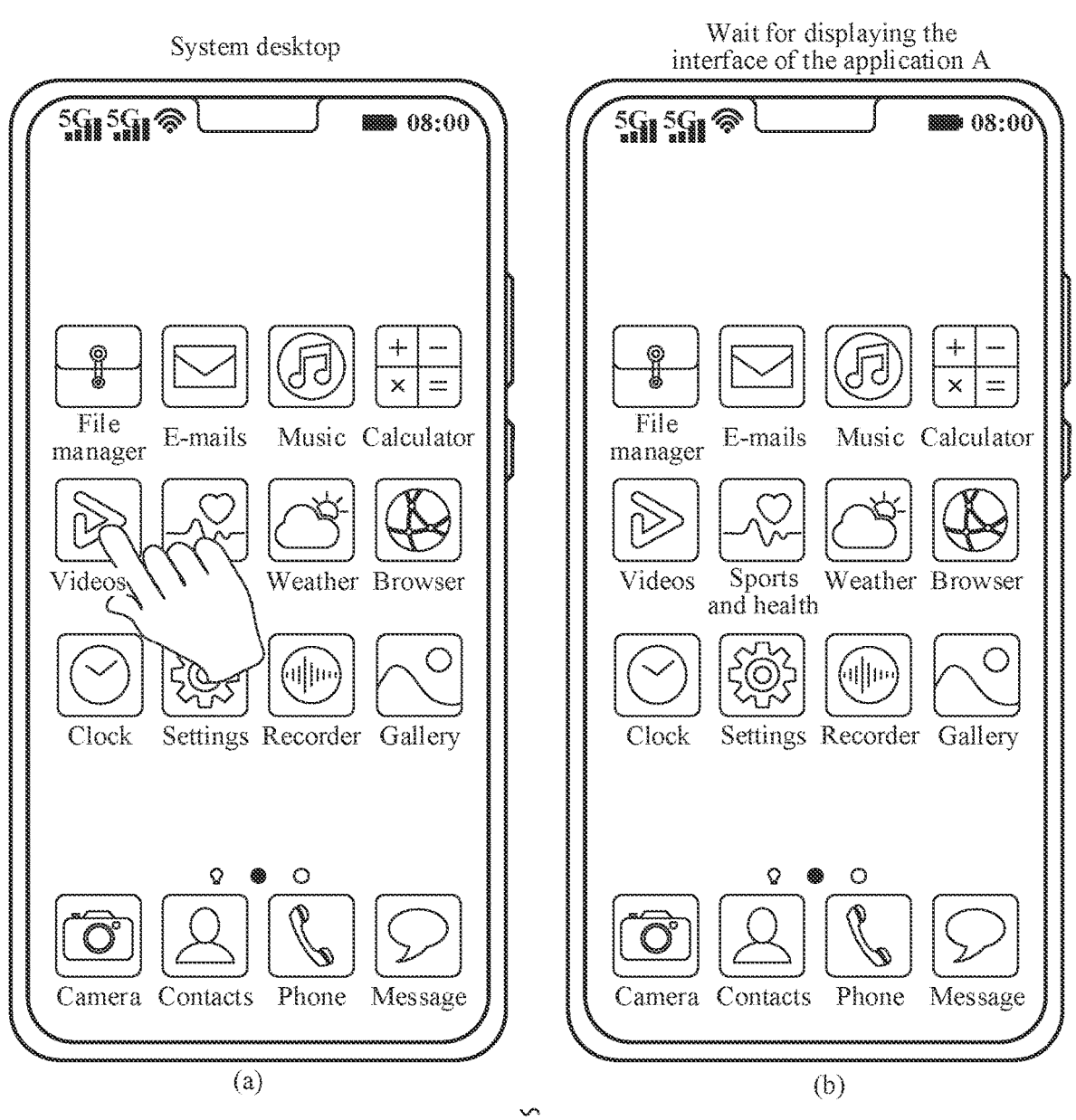
Figure 3C:
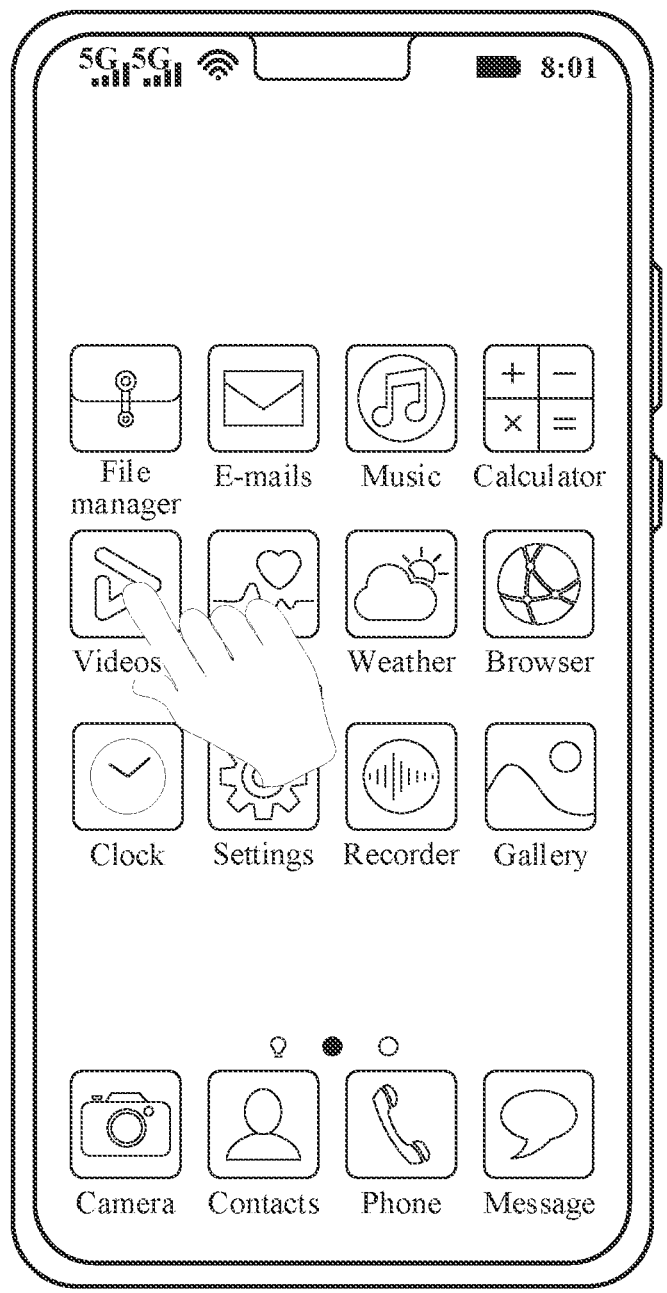

Because the process of cold starting of the application A takes a long time, from the user's point of view, after the user clicks the icon of the application A, an interface of the electronic device may still display an original interface (the system desktop), referring to (b) of FIG. 3A to FIG. 3C.

An example in which an advertisement interface does not exist when the application A is cold-started is used in the embodiment shown in FIG. 3A to FIG. 3C. In the process in which the electronic device displays the original interface (an interface in which the application A is located, where the interface may be the system desktop), another animation effect may also be added, for example, the clicked application icon of the application A is changed from a color icon to a grayscale icon and then changed to the color icon; or the application icon is enlarged by a preset multiple and then returned to an original size. Certainly, the change of the above application icon is still an animation effect with the interface in which the application icon is located (the system desktop in which the application A is located) as a background. In this embodiment of this application, the change process of the application icon may be understood as displaying the original interface (the system desktop in which the application A is located).

Referring to (c) of FIG. 3A to FIG. 3C, after the process of the application A draws the interface corresponding to the host Activity, the electronic device displays the interface corresponding to the host Activity.

From the user's point of view, a time from a click operation corresponding to (a) of FIG. 3A to FIG. 3C to the display of the application interface corresponding to (c) of FIG. 3A to FIG. 3C is relatively long, and the start response of the application A is relatively slow.

After the electronic device displays the interface of the application A (such as the video application) shown in (c) of FIG. 3A to FIG. 3C, the user performs a bottom upward sliding operation on the interface, so that the application enters the background from a foreground, and the electronic device displays the system desktop shown in (e) of FIG. 3A to FIG. 3C. For ease of description, an interface displayed by the electronic device before the application enters the background from the foreground is recorded as an interface 1, and an Activity corresponding to the interface 1 is recorded as an Activity1. Before the application enters the background from the foreground, the interface 1 corresponding to the Activity1 is used as a snapshot (a snapshot1) to save.

Referring to (d) of FIG. 3A to FIG. 3C, the snapshot obtained in this case is an image obtained by taking a screenshot of the interface 1 corresponding to the Activity1. It may be understood through (d) of FIG. 3A to FIG. 3C that, although the interface currently displayed by the electronic device is formed by the interface of the application A and a status bar, the saved snapshot is an image corresponding to the interface of application A, and the image does not include the status bar part.

Certainly, (d) of FIG. 3A to FIG. 3C is only used for an example. In actual applications, the obtained snapshot may also be an image obtained by taking a screenshot of the interface currently displayed by the electronic device, and the image includes the interface of the application A and the status bar part.

The user clicks the icon of the application A on the system desktop shown in (e) of FIG. 3A to FIG. 3C. Before the user clicks the icon of the application A, the process of the application A is not destroyed, that is, the application A is hot-started. When the application A is hot-started, if another Activity other than the Activity1 does not need to be created, the system first displays the snapshot snapshot1, referring to (a) of FIG. 4.

Figure 4:
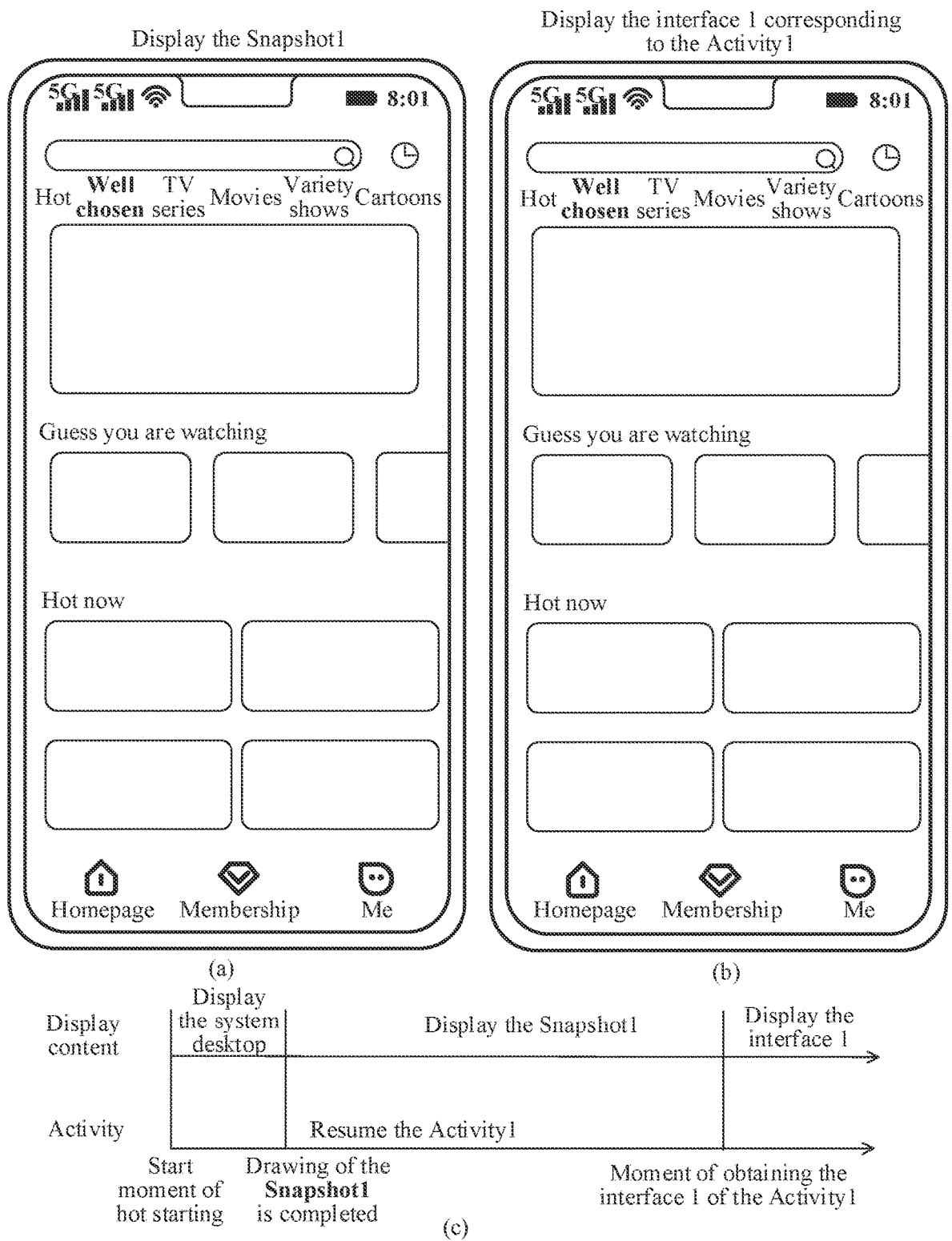
FIG. 4 is a schematic diagram of an interface when another application is started according to an embodiment of this application.

It should be noted that, the snapshot1 shown in (a) of FIG. 4 is the snapshot and the status bar that are synthesized by the system. If the previously saved snapshot is the image (which does not include the status bar) corresponding to the interface of the application A, the displayed snapshot1 is a snapshot layer and a status bar layer that are synthesized by the system. If the previously saved snapshot is the image (which includes the status bar) corresponding to the interface currently displayed by the electronic device, the displayed snapshot1 is an interface after the system covers the snapshot layer by using the status bar layer.

In this embodiment of this application, a snapshot of the application saved before the application returns to the background is recorded as a second image. In this embodiment of this application, a snapshot displayed when the application is started again is recorded as a first image. The saved snapshot (the second image) may include the status bar (status bar content at a moment of taking a screenshot) or may not include the status bar, and the displayed snapshot (the first image) is an image that does not include the status bar. Therefore, when the electronic device displays the first image, the saved second image and the current status bar content need to be synthesized, or the current status bar content needs to cover a region of the status bar of the second image.

As another example, the electronic device may also perform screenshot processing on the second image to obtain the first image that includes a first interface of the first application and does not include the status bar content (the status bar content at the moment of taking a screenshot), and then when the electronic device displays the first image, the first image and the current status bar content of the electronic device are synthesized.

In a process of displaying the snapshot1, the system resumes the Activity1 to obtain the interface 1 corresponding to the Activity1. After the interface 1 corresponding to the Activity1 is obtained, the electronic device changes from displaying the snapshot1 to displaying the interface 1, referring to (b) of FIG. 4.

As mentioned above, because the snapshot1 is a snapshot of the interface corresponding to the Activity1 of the application A and the interface 1 is the interface corresponding to the Activity1 of the application A, the interfaces displayed by the electronic device in (a) of FIG. 4 and (b) of FIG. 4 are same.

Based on (c) of FIG. 3A to FIG. 3C, (d) of FIG. 3A to FIG. 3C, (e) of FIG. 3A to FIG. 3C, (a) of FIG. 4, and (b) of FIG. 4, at a start moment when the application A is hot-started, if the process of the application A only needs to resume an Activity (such as the Activity1) and does not need to create another Activity, for changes of the Activity and a window of the electronic device, reference may be made to a time progress diagram shown in (c) of FIG. 4. From the start moment of hot starting, the electronic device first draws the snapshot1, and during the drawing of the snapshot1, the electronic device displays an original interface (such as the system desktop) in which the icon of the application A is located. After the snapshot1 is obtained by drawing, the electronic device changes from displaying the system desktop to displaying the snapshot1. When the electronic device displays the snapshot1, the process of the application A resumes the Activity1. At a moment of obtaining the interface 1 corresponding to the Activity1, the electronic device changes from displaying the snapshot1 to displaying the interface 1. From the user's point of view, the user considers that a start response time of the application A is from a moment when the user clicks the icon of the application A (which may be considered to be equivalent to the start time of hot starting) to a moment when the electronic device displays the snapshot1. Because the snapshot1 is in a picture format and it usually takes less time to draw the snapshot1 in the picture format, from the user's point of view, the start response of the application is very fast, thereby improving the user experience.

FIG. 5A and FIG. 5B to FIG. 6 are another application scenario according to an embodiment of this application. In (a) of FIG. 5A and FIG. 5B, an electronic device displays a system desktop, and a user clicks an icon of an application A (such as a video application) on the system desktop. In this case, a process of the application A does not exist in a background of a system, that is, the application A is cold-started.

In a process of cold starting of the application A, the system first creates the process of the application A for the application A. After the process is created for the application A, the process of the application A starts a host Activity of the application A and draws an interface corresponding to the host Activity. In actual applications, the process of the application A may also be created first. After the process of the application A is started, an advertising Activity is created (create) through the process of the application A to obtain and display an interface corresponding to the advertising Activity, referring to an advertisement interface in (b) of FIG. 5A and FIG. 5B. In a process of displaying the advertisement interface corresponding to the advertising Activity, a host Activity of the application A is started and an interface corresponding to the host Activity is drawn through the process of the application A.

Similarly, in a process in which the process is created for the application A and the advertising Activity is created (create) through the process to obtain the interface corresponding to the advertising Activity, animation effects described in the embodiments shown in FIG. 3A to FIG. 3C and FIG. 4 may also be added. Details are not described herein again.

Figure 5A:
FIG. 5A and FIG. 5B are a schematic diagram of an interface when another application is started according to an embodiment of this application.
Figure 5B:
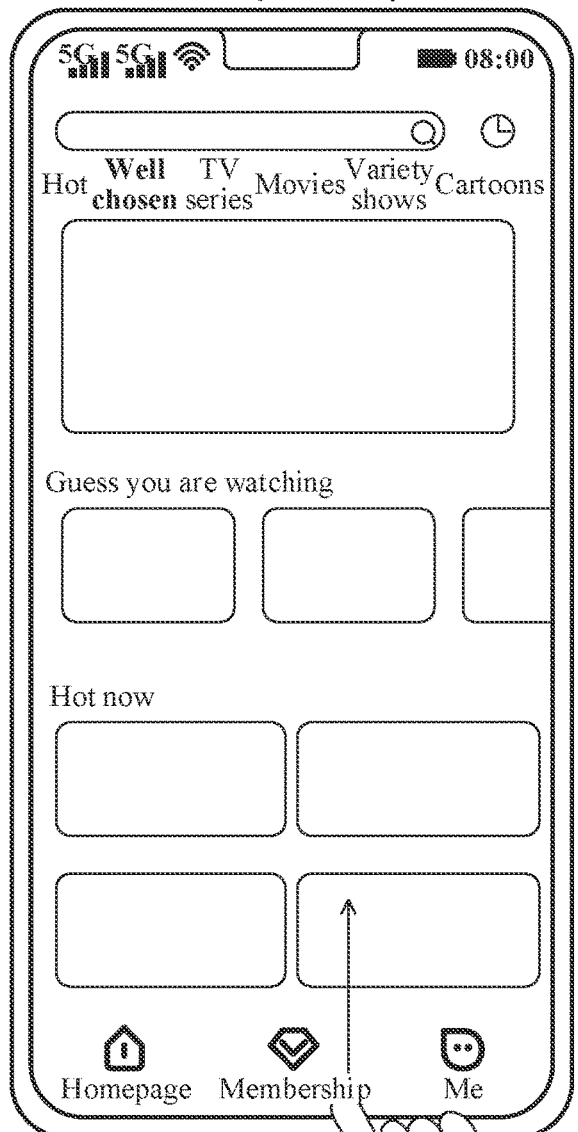
Figure 5B:
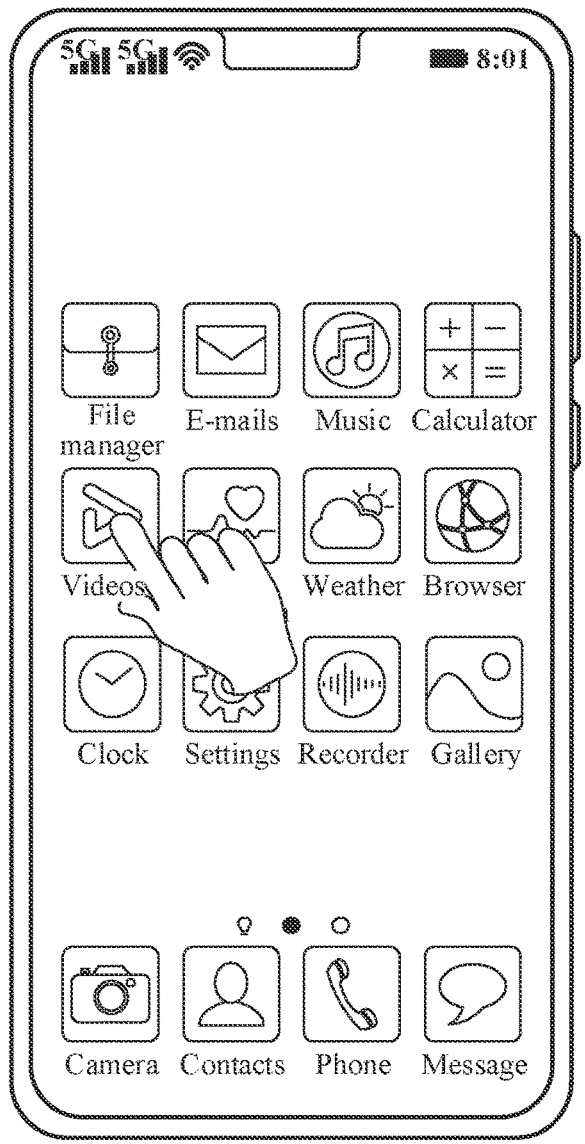

Referring to (c) of FIG. 5A and FIG. 5B, after the process of the application A draws the interface corresponding to the host Activity, the electronic device changes from displaying the advertisement interface to displaying the interface corresponding to the host Activity.

After the electronic device displays the interface of the application A (such as the video application) shown in (c) of FIG. 5A and FIG. 5B, the user performs a bottom upward sliding operation on the interface, so that the application enters the background from a foreground, and the electronic device displays the system desktop shown in (d) of FIG. 5A and FIG. 5B. For ease of description, an interface displayed by the electronic device before the application enters the background from the foreground is recorded as an interface 1, and an Activity corresponding to the interface 1 is recorded as an Activity1. Before the application enters the background from the foreground, the interface 1 corresponding to the Activity1 is used as a snapshot (a snapshot1) to save.

The user clicks an icon of the application A on the system desktop shown in (d) of FIG. 5A and FIG. 5B. It should be noted that, there may be a period of time between that the electronic device displays an interface shown in (d) of FIG. 5A and FIG. 5B and that the user clicks the icon of the application A in the interface. During the period of time, the user may also perform other operations through the electronic device, for example, clicking an icon of an application B (an application other than the application A in the electronic device), so that the application B runs in the foreground, and the electronic device displays the system desktop after the application B returns to the background for running.

Before the user clicks the icon of the application A, the process of the application A is not destroyed, that is, the application A is hot-started. When the application A is hot-started, because displaying the advertisement interface is preset for the application A, that is, before the Activity1 needs to be resumed, an Activity0 needs to be pre-created. In this embodiment of this application, the Activity0 is a preset advertising Activity. In actual applications, a developer of the application A may set that: the Activity0 is created every time the application A is started, an advertisement interface corresponding to the Activity0 may be displayed during cold starting, and the advertisement interface corresponding to the Activity0 may or may not be displayed during hot starting. The specific setting to be adopted may be determined by the developer of the application A.

In a phase of starting the application, if a behavior of creating (create) an Activity exists, to avoid that an interface corresponding to the newly created Activity does not correspond to a snapshot saved when the application returns to the background previously, the system of the electronic device usually sets that a process of the snapshot does not take effect, that is, a snapshot of a final interface of the application saved when returning to the background previously is no longer displayed.

To avoid frequently displaying advertisements and reducing the user experience, the developer of the application A may set that: the advertisement interface corresponding to the Activity0 is not displayed in a phase of hot starting of the application, that is, the process of the application A may create the Activity0, but does not display the advertisement interface corresponding to the Activity0. Therefore, after the user clicks the icon of the application A to start hot starting, the electronic device displays the original interface (the system desktop) displayed by the electronic device in which the icon of the application A is located when the user clicks the icon of the application A, referring to (a) of FIG. 6. In the process of displaying the original interface in which the icon of the application A is located, the process of the application A creates the Activity0, and resumes the Activity1.

Figure 6:
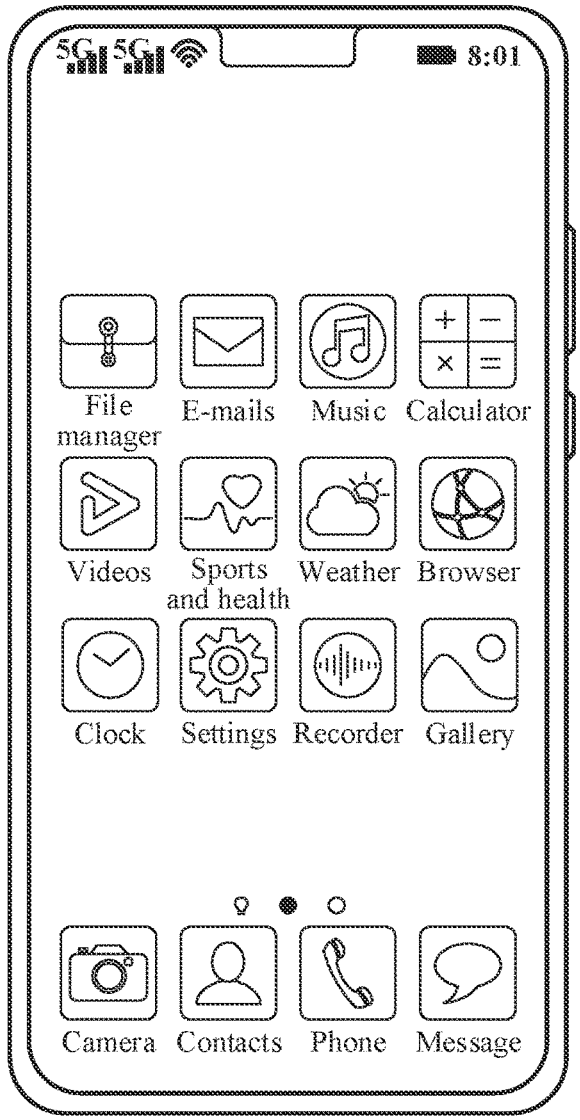
FIG. 6 is a schematic diagram of an interface when another application is started according to an embodiment of this application.
Figure 6:
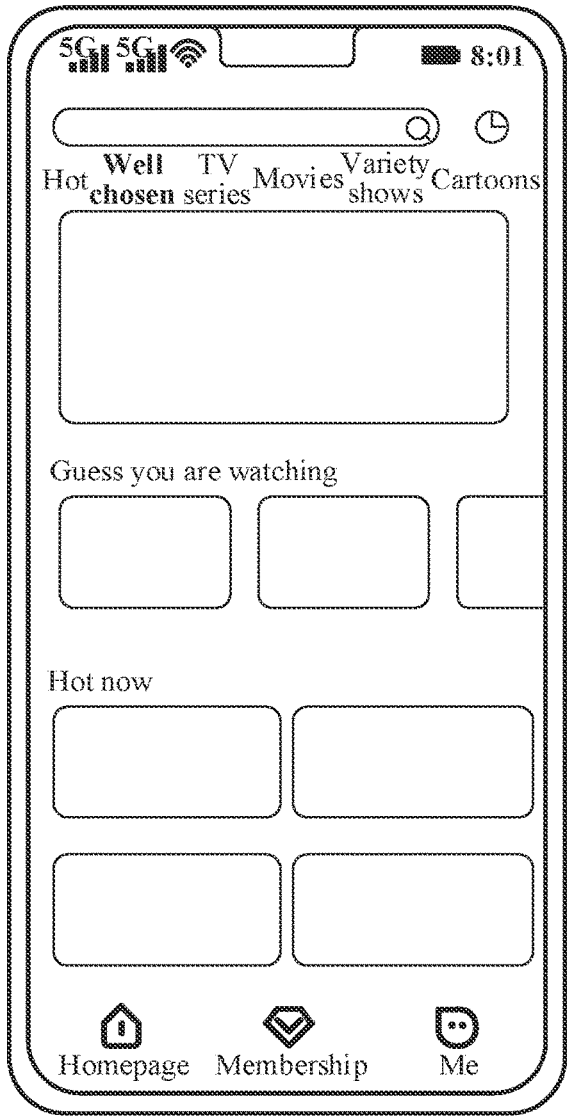
Figure 6:
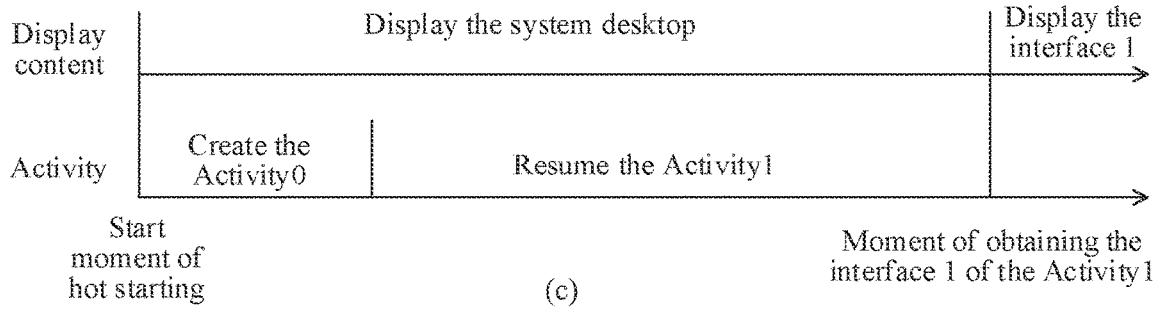

(b) of FIG. 6 is the interface 1 corresponding to the Activity1 obtained after the Activity1 is resumed.

Referring to (c) of FIG. 6, in a case that a scenario of creating an Activity exists when the application A is hot-started, no matter whether an advertisement page is displayed or the advertisement interface is not displayed (by using an example in which the advertisement interface is not displayed in (c) of FIG. 6), the system desktop is displayed in a duration from that the user clicks the icon of the application A to that the electronic device displays the interface 1 corresponding to the Activity1. From the user's point of view, the start response speed of the application is relatively slow.

Figure 7:
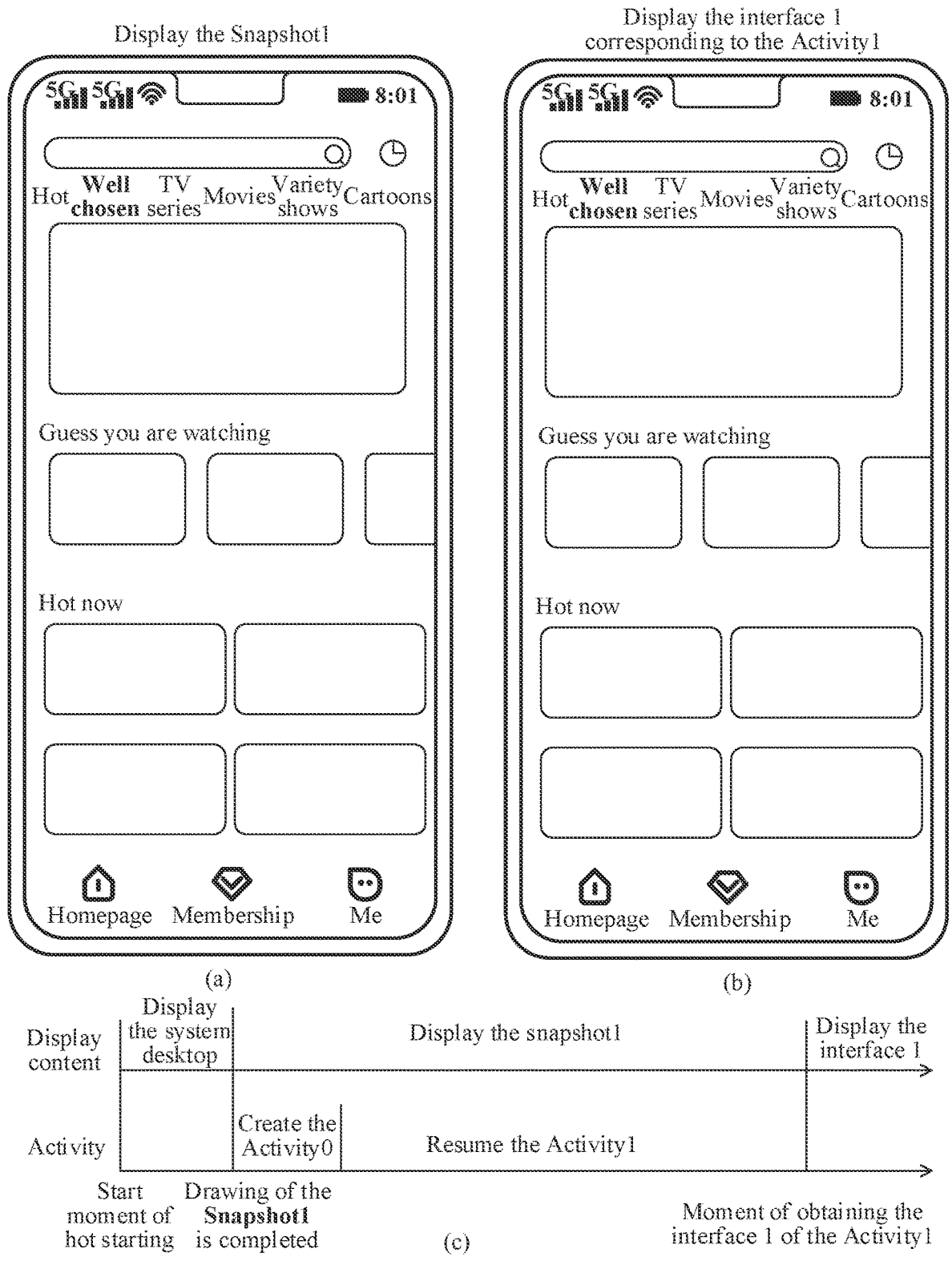
FIG. 7 is a schematic diagram of an interface when another application is started according to an embodiment of this application.

To resolve the above problem, in a case that another Activity needs to be created when the application is hot-started, a process of displaying the interface during hot starting may be performed according to a display logic shown in FIG. 7.

Referring to FIG. 7, before an electronic device displays (a) of FIG. 7, a scenario is same as that shown in (a) of FIG. 5A and FIG. 5B to (d) of FIG. 5A and FIG. 5B. For details, reference may be made to related descriptions of (a) of FIG. 5A and FIG. 5B to (d) of FIG. 5A and FIG. 5B, and details are not described herein again.

In an application scenario shown in FIG. 7, when an application is started, determination logics are added to determine: whether the application currently switched to a foreground is hot-started, and whether a snapshot is saved when the application is switched to a background; whether an Activity corresponding to an interface corresponding to the snapshot of the application is not destroyed (to avoid that an interface displayed by the application A after hot starting does not match content of the snapshot); and whether the application creates another Activity in a process of displaying an interface when switched to the background previously. If the determination logics are yes, the following content is forced to be performed.

When the application is started, a system first draws and displays a snapshot (a snapshot1), referring to an interface shown in (a) of FIG. 7. In addition, referring to (c) of FIG. 7, in a process of drawing the snapshot (the snapshot1), an electronic device displays an interface (such as a system desktop) in which an icon of the application A is located. After the drawing of the snapshot (the snapshot1) is completed by the electronic device, a window of the electronic device changes from displaying the system desktop to displaying the snapshot1. When the electronic device displays the snapshot1, a process of the application A creates an Activity0, resumes an Activity1, and obtains an interface 1 corresponding to the Activity1 after resuming the Activity1. After the interface 1 is obtained, the system changes from displaying the snapshot (the snapshot1) to displaying the interface 1, referring to an interface shown in (b) of FIG. 7.

The process of hot starting of the application in FIG. 7 may also be understood as that: when the application is hot-started, in a case that an Activity is created and the Activity corresponding to a snapshot is not destroyed, the saved snapshot is forced to be displayed in a phase of creating the Activity until the system obtains a finally displayed interface (an interface corresponding to an Activity at the top of a task stack before the application is switched to the background previously).

It should be noted that, before the application A returns to the background previously, an image of a snapshot is generated by the interface corresponding to the Activity1 of the application A; and when the application A is started, after the process of the application A resumes the Activity1, the interface displayed by the electronic device is the interface corresponding to the Activity1. In theory, content of an interface (or the snapshot generated by the interface) corresponding to the Activity1 before the application A returns to the background previously is same as content of the interface corresponding to the Activity1 displayed after the application A is started currently.

However, in actual applications, there may be some differences between the content of the interface corresponding to the Activity1 displayed after the application A is started and the content of the saved snapshot. For example, in a scenario in which the interface corresponding to the Activity1 may dynamically display two (or more than two) images to perform sliding switching, if a moment of generating the snapshot by taking a screenshot is just at a moment when the image is slidingly switched, the snapshot generated by taking the screenshot may display half of the two images. After the application is started again, the interface displayed by the electronic device may be an interface after the image is slidingly switched in the interface corresponding to the Activity1. Certainly, the interface corresponding to the snapshot and the interface after the electronic device is started are obtained based on a same Activity. Therefore, layouts of the content of the snapshot and content of the interface displayed after the electronic device is started are basically consistent, and even if there are some differences in content, from the user's point of view, the differences are usually considered to be normal playback of animations in the interface.

Based on this understanding, if the application A displays an interface before returning to the background, the application A also displays an interface after being started when returning to the foreground for running again. If the two interfaces correspond to a same Activity, even if content displayed by the two interfaces is slightly different, it may also be considered that the two interfaces are the same interface. This is because usually one Activity corresponds to one interface. If two interfaces are generated based on a same Activity, basic frameworks of the two interfaces are same. Even if specific content of the two interfaces is slightly different, the two interfaces belong to the same interface.

The above embodiments are all described by using an example in which the application A returns to the background in a case that the electronic device displays a host interface of the application A. This embodiment of this application is described through FIG. 8A to FIG. 8C and FIG. 9 by using an example in which the application A returns to the background in a case that the electronic device displays a non-host interface of the application A.

Figure 8A:
FIG. 8A to FIG. 8C are a schematic diagram of an interface when another application is started according to an embodiment of this application.
Figure 8B:
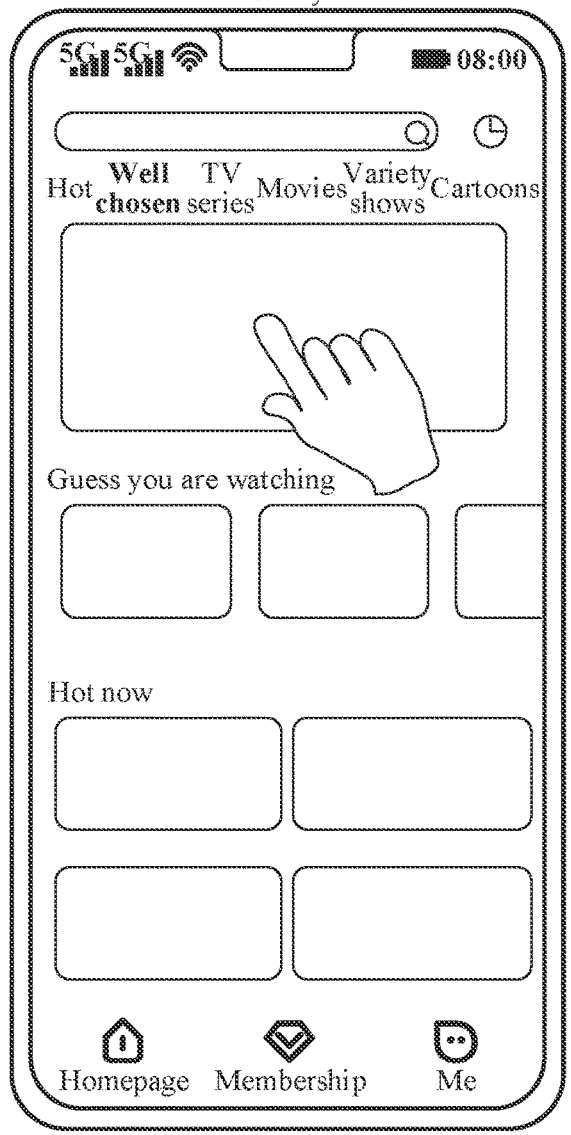
Figure 8B:
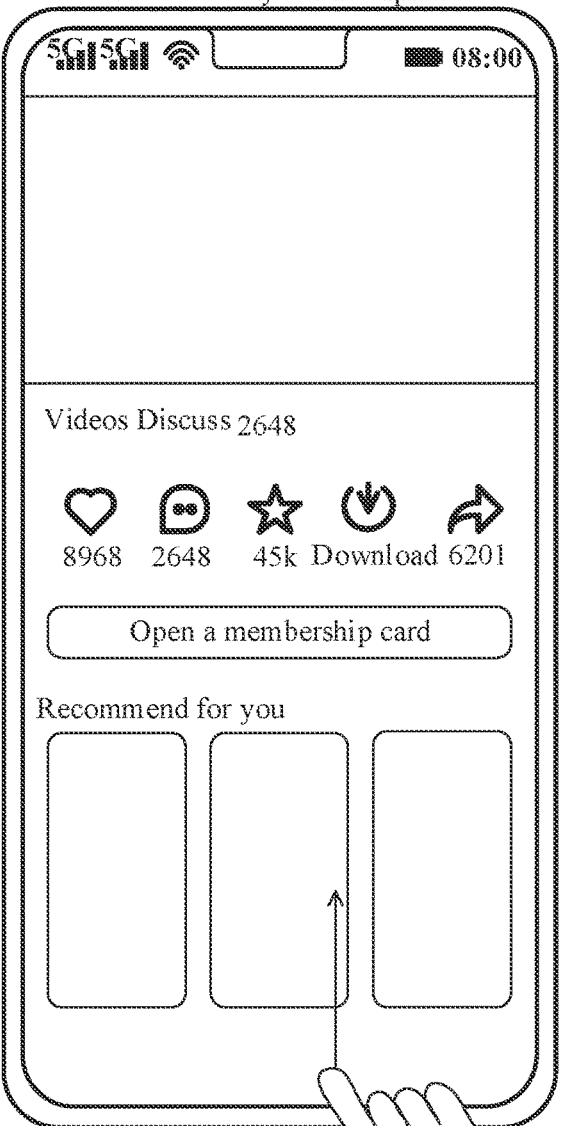
Figure 8C:
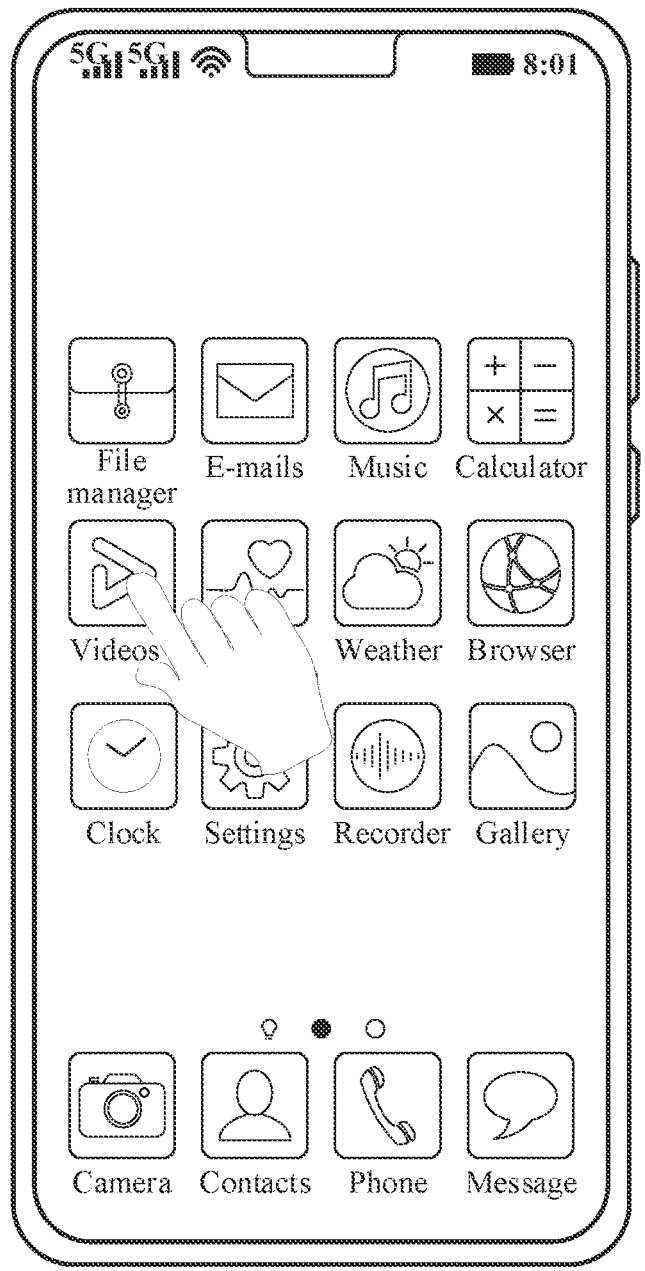

Referring to FIG. 8A to FIG. 8C, (a) and (b) of FIG. 8A to FIG. 8C are described by using (a) and (b) of FIG. 5A and FIG. 5B as an example, and it may be understood that, a behavior of creating an Activity (such as an Activity corresponding to an advertisement interface) exists when the application A is started. After displaying the advertisement interface for a period of time, the electronic device displays a host interface of the application A (an interface 1 corresponding to an Activity1) shown in (c) of FIG. 8A to FIG. 8C.

In a case that the electronic device displays the interface 1 shown in (c) of FIG. 8A to FIG. 8C, if a user clicks a control in the interface 1, the electronic device displays another interface, where the interface is an interface 2 corresponding to an Activity2 of the application A.

(d) of FIG. 8A to FIG. 8C is the interface 2 corresponding to the Activity2 of the application A displayed by the electronic device. If the user returns to a system desktop through a gesture shown in (d) of FIG. 8A to FIG. 8C, in this case, the electronic device displays the system desktop shown in (e) of FIG. 8A to FIG. 8C. Certainly, before the electronic device displays the system desktop shown in (e) of FIG. 8A to FIG. 8C, the electronic device saves the interface corresponding to the Activity2 as a snapshot (a snapshot2) of the application A.

In the interface shown in (e) of FIG. 8A to FIG. 8C, if the user clicks an icon of the application A on the system desktop, determination logics are added to an internal system to determine: whether the application currently switched to a foreground is hot-started, and whether a snapshot is saved when the application is switched to a background; whether an Activity corresponding to an interface corresponding to the snapshot of the application is not destroyed; and whether the application creates another Activity in a process of displaying an interface switched to the background previously. If the determination logics are yes, the following content is forced to be performed.

Figure 9:
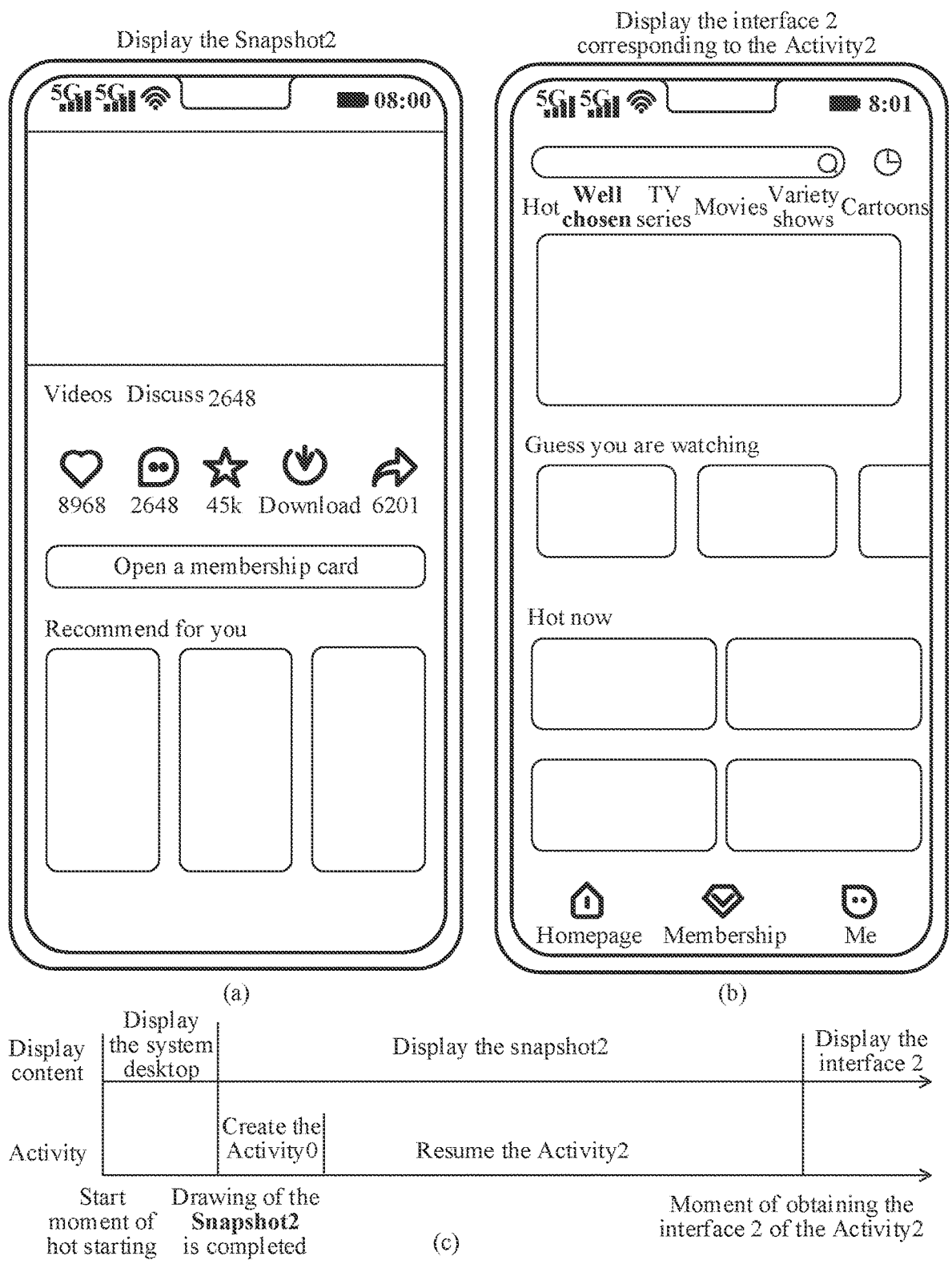
FIG. 9 is a schematic diagram of an interface when another application is started according to an embodiment of this application.

Referring to an interface shown in (a) of FIG. 9, when the application A is started, a system first draws and displays a snapshot (a snapshot2). In addition, referring to (c) of FIG. 9, in a process of drawing the snapshot (the snapshot2), an electronic device displays an interface (such as a system desktop) in which an icon of the application A is located. After the drawing of the snapshot (the snapshot2) is completed by the electronic device, a window of the electronic device changes from displaying the system desktop to displaying the snapshot2. When the electronic device displays the snapshot2, a process of the application A creates an Activity0, resumes an Activity2, and obtains an interface 2 corresponding to the Activity2 after resuming the Activity2. After the interface 2 is obtained, the system changes from displaying the snapshot (the snapshot2) to displaying the interface 2, referring to an interface shown in (b) of FIG. 9.

Figure 10:
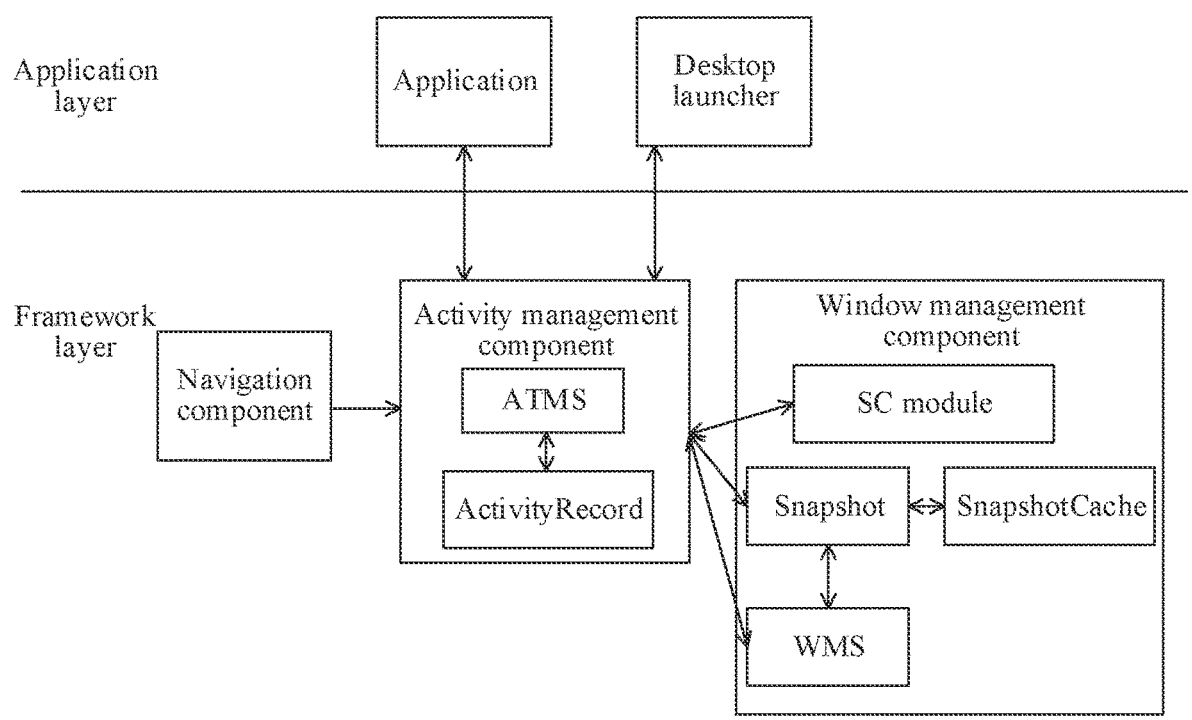
FIG. 10 is a diagram of a technical architecture of an application starting method according to an embodiment of this application.

For clearer understanding of the embodiments shown above, reference may be made to a diagram of a technical architecture shown in FIG. 10. The diagram of the technical architecture provided in this embodiment of this application includes an application layer and a framework layer. The technical architecture shown in FIG. 10 is only one example. In actual applications, more layers than those shown in FIG. 10 may be included, and each layer may include more components than those shown in FIG. 10.

The application layer has various applications, such as the application A in the above application scenario, and the application layer also has a desktop launcher. The desktop launcher (Launcher) is configured to manage a system desktop, for example, starting or stopping the system desktop.

The framework layer has a navigation component, an activity management component (ActivityManagerServer, AMS), and a window management component.

The navigation component may be implemented in various manners, for example, gesture navigation, floating navigation, and three-key navigation. For details, reference may be made to descriptions of subsequent embodiments.

The activity management component includes: an activity task management component (ActivityTaskManagerService, ATMS) and an ActivityRecord.

The ATMS is configured to start, switch, and schedule an Activity.

The ActivityRecord records information of the Activity, for example, records a status of the Activity.

The AMS is configured to manage a life cycle of an Activity of an application. By using some statuses in the life cycle as an example for description, when an Activity is opened for the first time after the application is cold-started, the Activity is first in an on-create status; when the application is switched from a foreground to a background, the Activity enters an on-stop status, and in this status, an interface corresponding to the Activity is invisible; when the Activity is opened again, the Activity first enters an on-resume status; when the Activity is switched off, the Activity may enter an on-destroy status to complete destruction, and the Activity is invisible in the on-destroy status; and if the Activity is opened again, the Activity enters the on-create status again.

The window management component includes: a Snapshot, a SnapshotCache, and a WMS.

The Snapshot is configured to display the interface of the Activity, and is also configured to save and display a snapshot of a final interface displayed before the application is switched to the background.

The SnapshotCache is configured to cache the snapshot of the final interface displayed before the application is switched to the background that is obtained by the Snapshot module.

The WMS is configured to draw a window (such as, an interface, and a snapshot of the interface).

In this embodiment of this application, a SnapshotConcurrent module (SC module) is added in the window management component. The SC module is configured to determine whether the application meets the following conditions (or all are yes) when the application is started, and force to perform a snapshot display process of the application in a case that the conditions are met or all are yes.

As an example of the SC module, when the application is hot-started, the SC module determines whether the application meets the following conditions:
(1) whether the application currently switched to the foreground is hot-started;
(2) an Activity corresponding to a snapshot saved before the application is switched to the background is not destroyed when the application is currently started; and
(3) whether an Activity is created in a process of starting the application.

In a case that the above conditions are met, a snapshot of the application is first drawn, and the snapshot is displayed after the drawing of the snapshot is completed.

In a process of displaying the snapshot of the application, a process of the application A creates an Activity0 and resumes an Activity1. After drawing of an interface corresponding to the Activity1 is completed, the interface corresponding to the Activity1 is displayed.

In this embodiment of this application, when the snapshot of the application is drawn, the process of the application may also start to create the Activity0.

In the above example, because the snapshot is in a picture format and the system does not need a complicated drawing logic compared to the interface corresponding to the Activity1, a response speed of displaying the snapshot by the electronic device is faster than a response speed of displaying the interface. From the user's point of view, the start response speed of the application is faster. Certainly, an interface 1 corresponding to the Activity1 is consistent with content of the snapshot (generated by the interface 1). Therefore, after the drawing of the interface 1 corresponding to the Activity1 is completed, the user cannot perceive a process in which the electronic device changes from displaying the snapshot to displaying the interface 1, thereby improving the user experience.

It should be noted that, in the above embodiment, the electronic device first displays the snapshot, and needs to draw the snapshot before displaying the snapshot. Therefore, in a process of drawing the snapshot, the electronic device displays an original interface (such as a system desktop in which an icon of the application A is located) for a period of time. The length of the period of time depends on the length of the process of drawing the snapshot. Usually, the process of drawing the snapshot is shorter, and it may also be considered that the electronic device first displays the snapshot after the user clicks the icon of the application.

Figure 11A:
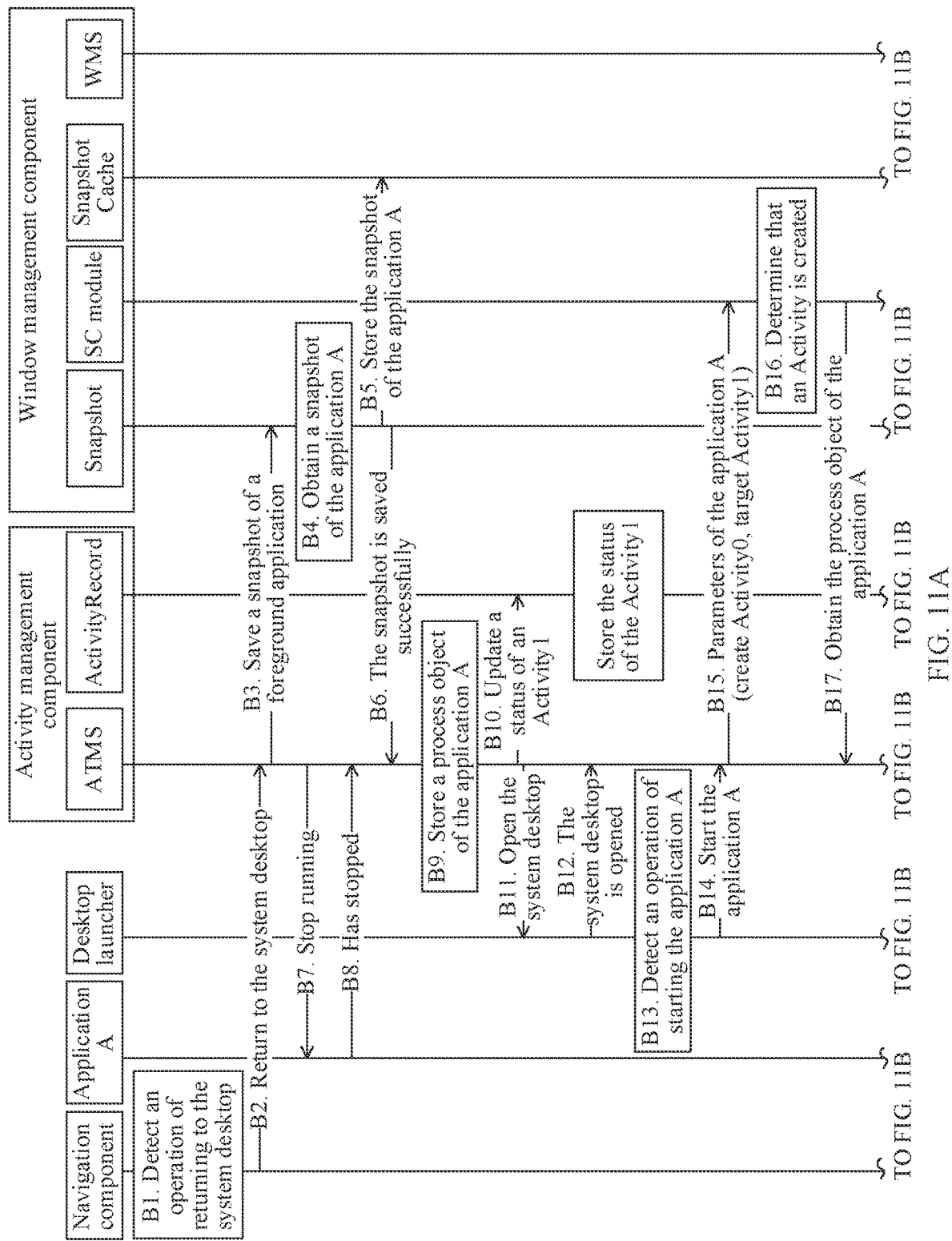
Figure 11C:
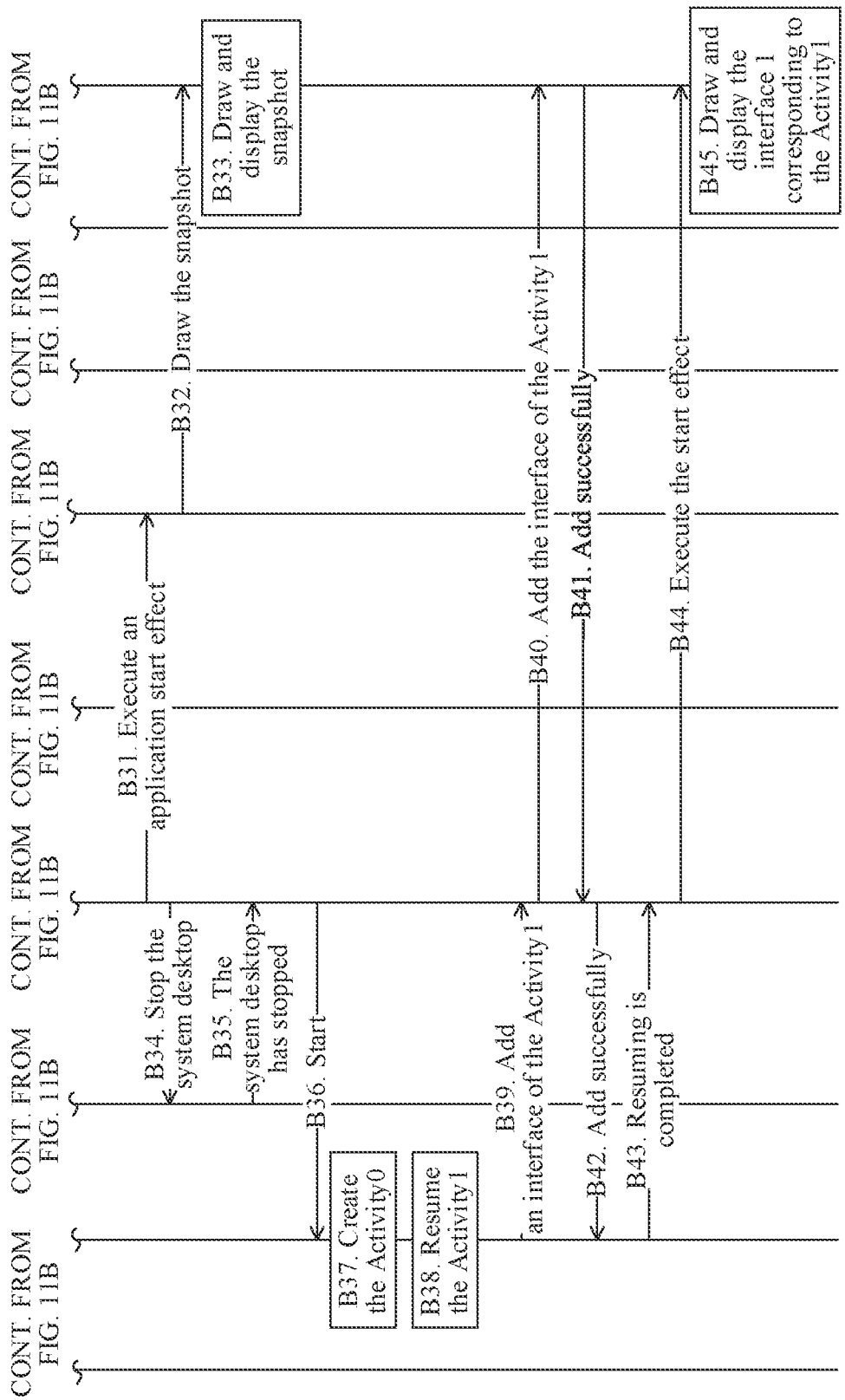

The application starting method is described through a time-sequence diagram shown in FIG. 11A to FIG. 11C. The method includes the following steps.

Step B1. A navigation component detects information of returning to a system desktop.

A system of an electronic device has a navigation component, and in a case that a user triggers the electronic device to display the system desktop through various gesture information, the navigation component may detect the information of returning to the system desktop.

As an example, the user triggers the electronic device to display the system desktop through gesture navigation (for example, a finger of the user slides upward from the bottom of a display screen of the electronic device); or, the user triggers the electronic device to display the system desktop through floating navigation (for example, the finger of the user clicks a floating ball button displayed on the display screen of the electronic device); or, the user triggers the electronic device to display the system desktop through three-key navigation (for example, the finger of the user clicks a return-to-the-host-interface button in the three-key navigation).

A gesture shown in (c) of FIG. 5A and FIG. 5B may trigger the navigation component to detect the information of returning to the system desktop.

An example in which the electronic device displays the system desktop after the user triggers an application A to return from a foreground to a background through the gesture navigation is used in this embodiment of this application. In actual applications, after the application A returns from the foreground to the background, the electronic device may display another interface other than the system desktop. After performing an operation on the another interface, the user returns to the system desktop again.

As an example, the user triggers the electronic device to display a side navigation bar through a gesture, the side navigation bar is a floating interface that appears on a side of the electronic device, and the floating interface includes icons of a plurality of applications. If the user clicks an icon of an application B in the side navigation bar, the electronic device controls the application A to be switched from the foreground to the background, and the electronic device displays an interface of the application B. In a case that the electronic device displays the interface of the application B, the user triggers the electronic device to return to the system desktop through an operation.

The above examples use a gesture of the user on a touch screen of the electronic device as an example to trigger the electronic device to switch the application to the background. In actual applications, the application may also be switched from the foreground to the background in a manner of a voice instruction or an air gesture.

As an example, in a case that the electronic device displays an interface of the application A, if the user sends voice information of "returning to the system desktop", the electronic device switches the application A to the system background, and the electronic device displays the system desktop.

If the application continues to send voice information of "opening the application B", the electronic device displays the interface of the application B. If the user sends the voice information of "returning to the system desktop" again, the electronic device switches the application A to the system background, and the electronic device displays the system desktop.

A manner of triggering the application to be switched from the foreground to the background for running is not limited in the embodiments of this application. The interface displayed by the electronic device after the application is switched to the background for running is also not limited. An operation of the user on the electronic device in a middle time period from that the application A returns to the background for running to that the application A is started again is also not limited.

Step B2. After the navigation component detects the information of returning to the system desktop, the navigation component sends information to an ATMS, where the information is used for notifying the ATMS of returning to the system desktop.

After the information used for returning to the system desktop that is sent by the navigation component is received, on the one hand, the ATMS needs to save a snapshot of a final interface displayed by an application running in the foreground of the electronic device (referring to step B3 to step B6), and on the other hand, the ATMS needs to stop the application currently running in the foreground of the electronic device (referring to step B7 to step B8).

Step B3. After receiving the information used for returning to the system desktop that is sent by the navigation component, the ATMS sends information to a Snapshot, where the information is used for instructing the Snapshot to save the snapshot of the application currently running in the foreground of the electronic device.

Step B4. After receiving the information used for instructing to save the snapshot of the application currently running in the foreground of the electronic device that is sent by the ATMS, the Snapshot takes a screenshot of the application currently running in the foreground of the electronic device, to obtain a snapshot of an interface currently displayed by the application currently running in the foreground of the electronic device.

As an example, in a case that the application currently running in the foreground of the electronic device is the application A, the Snapshot takes a screenshot of an interface currently displayed by the application A to obtain a snapshot of the interface currently displayed by the application A.

It should be noted that, the snapshot obtained in this case is not an image snapshot obtained by taking a screenshot of content currently displayed on the display screen of the electronic device, but an image snapshot obtained according to the interface currently displayed by the application A in the electronic device. Content that may be included in the image snapshot may be content of the interface of the application A, and may not include content of the system interface (such as a status bar).

The snapshot obtained in this step may correspond to an interface 1 (which does not include content corresponding to the status bar) of the application A shown in (c) of FIG. 5A and FIG. 5B.

Step B5. After the snapshot of the application is obtained, the Snapshot caches the obtained snapshot of the application in a SnapshotCache.

Step B6. After the obtained snapshot of the application is successfully cached in the SnapshotCache, the Snapshot sends a message that the snapshot of the application is successfully saved to the ATMS.

Step B7. After receiving the information for returning to the system desktop that is sent by the navigation component, the ATMS sends a message of stopping running to the application (the application A) currently running in the foreground of the electronic device.

Step B8. The application currently running in the foreground of the electronic device stops running after receiving the message, and sends, after stopping running, a message used for indicating that the application has stopped running currently to the ATMS.

It should be noted that, to ensure that the snapshot of the electronic device currently running in the foreground of the electronic device can be obtained, step B7 may be performed after step B3 has been performed for a period of time, or step B7 may be performed after step B6. This is not limited in this embodiment of this application.

Step B9. After receiving the message that running has been stopped and the message that the snapshot of the application has been successfully saved that are sent by the application (the application A) running in the foreground of the electronic device, the ATMS may store a process object of the application.

The process object of the application is used for indicating a status of a process of the application. As an example, when an identifier corresponding to the process object of the application is a first identifier (such as 1), it indicates that the process of the application exists; and when the identifier corresponding to the process object of the application is a second identifier (such as 0), it indicates that the process of the application does not exist (has been destroyed). When the process object of the application is stored, the ATMS stores it with the first identifier. When the process object of the application is destroyed or the application is ejected (if the application is ejected, the process of the application is naturally destroyed), the ATMS updates the first identifier to the second identifier.

The first identifier and the second identifier are only used for an example. In actual applications, the second identifier may also be null (null).

Step B10. The ATMS sends a newest status of an Activity1 of the application A to an ActivityRecord, to update a status of the Activity1 of the application A stored in the ActivityRecord.

As an example, as shown in (c) of FIG. 5A and FIG. 5B, an Activity at the top of a task stack of the application A in this case is the Activity1. The ATMS includes the task stack. The ATMS may determine the Activity at the top of the task stack of the application A as the Activity1 from the task stack of the application A, and then sends the status (an on-Pause status or on-stop status) of the Activity1 to the ActivityRecord. Certainly, when the status of the Activity1 of the application A is destroyed (destroy), the status of the Activity1 recorded in the ActivityRecord is updated to an on-destroy status.

After step B10, the ActivityRecord stores the status of the Activity1.

Step B11. After sending the status of the Activity1 of the application A to the ActivityRecord, the ATMS sends a message used for instructing to open a system desktop to a desktop launcher. The message may instruct the display screen of the electronic device to display the system desktop.

Step B12. After receiving the message used for instructing to open the system desktop that is sent by the ATMS, the desktop launcher displays the system desktop on the display screen of the electronic device, and returns a message that the system desktop has been opened to the ATMS.

After this step, the electronic device displays an interface shown in (d) of FIG. 5A and FIG. 5B, that is, the display screen of the electronic device displays the system desktop.

Certainly, the user may also click an icon of the application A on the system desktop, to start the application A again. Because a time after the application A returns from the foreground to the background is relatively short, in this case, the application A is usually hot-started.

Certainly, an example in which the application A is started again in a case that the electronic device displays the system desktop after the application A returns from the foreground to the background is used for descriptions in this embodiment of this application. In actual applications, after the application A returns from the foreground to the background, the user may also perform another operation on the system desktop of the electronic device to return to the system desktop of the electronic device again after entering another interface, and then click the icon of the application A on the system desktop to start the application A.

Step B13. The desktop launcher detects an operation of starting the application A.

A scenario of hot starting of the application A that this embodiment of this application focuses on describing may be a scenario in which the user clicks the icon of the application on the system desktop to start the application, for example, (d) of FIG. 5A and FIG. 5B. In this scenario, the desktop launcher detects the operation of starting the application A.

Certainly, in actual applications, the scenario may also be a scenario of jumping to the application A through another application to hot start the application A. In this scenario, another application may also detect the operation of starting the application A. Alternatively, the scenario may also be a scenario in which the user hot starts the application A in a manner of clicking a mini control on the system desktop. In this scenario, the mini control may detect the operation of starting the application A.

Figure 12:
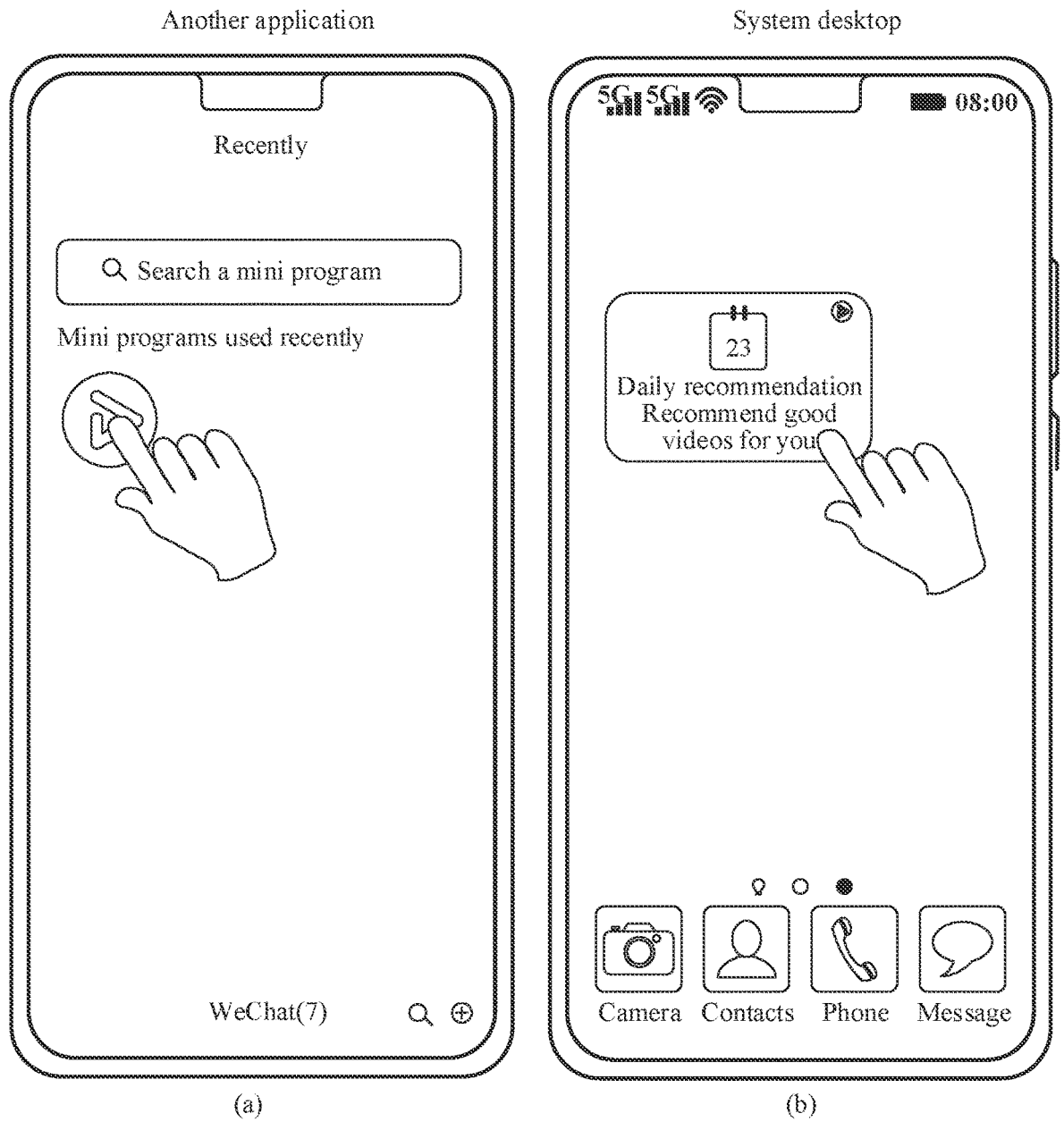
FIG. 12 is a schematic diagram of a manner of starting an application according to an embodiment of this application.

(a) of FIG. 12 is the scenario of jumping to the application A through another application to hot start the application A. In this scenario, the electronic device displays an interface of another application (such as an application B), the interface includes a jump control of the application A, the user clicks the jump control of the application A, the application B detects the operation of starting the application A, and the electronic device starts the application A.

(b) of FIG. 12 is the scenario in which the user hot starts the application A in the manner of clicking the mini control on the system desktop. When the user clicks the mini control on the system desktop, the mini control may detect the operation of starting the application A.

Step B14. After the desktop launcher detects the operation of starting the application A, the desktop launcher sends an instruction used for instructing to start the application A to the ATMS, where the instruction may carry a unique identification of the application A. The unique identification may be a package name of the application A.

Step B15. After receiving the instruction used for instructing to start the application A that is sent by the desktop launcher, the ATMS obtains start parameters of the application A: creating an Activity0, and a target Activity being the Activity1, and sends the start parameters of the application A to an SC module. The start parameters may also be recorded as start information.

The Activity0 may be an advertising Activity added by a developer of the application A when the application A is started, and certainly, may also be another Activity that needs to be created when the application A is started. The target Activity is an Activity that is reserved at the top of the task stack before the application A returns to the background previously.

After receiving the start parameters of the application A that is sent by the ATMS, the SC module may determine whether the application A meets determination logics in the above embodiments. During determination, the SC module first determines a currently started application as the application A according to a received application identification, and then determines whether three conditions are met (or whether all are yes). An execution order of the three determination steps is in no particular order. This application does not limit the sequence of the three determination steps. Certainly, if an execution result of any determination step is no, the SC module may no longer perform subsequent determination steps, but perform an original process when the application A is started that is set by the developer of the application A and the system.

In this embodiment of this application, it may be first determined whether the application A has a behavior of creating another Activity, then it may be determined whether the application is hot-started, and it may be finally determined whether the target Activity is not destroyed. For details, reference may be made to content of step B16 to step B22.

Step B16. The SC module determines that the behavior of creating another Activity exists (which is determined through creating the Activity0 in the start parameters) according to the received start parameters of the application A.

Step B17. The SC module obtains a process object of the application A from the ATMS (which may be obtained through the unique identification of the application).

Step B18. The SC module obtains the process object of the application A from the ATMS.

As mentioned above, an identifier in the process object of the application A may determine whether the process of the application A still exists in the system. If the identifier of the process object is the first identifier, it indicates that the process of the application A still exists in the system, and it may be determined that the application A is currently hot-started.

Step B19. The SC module determines that the application A is hot-started according to the obtained process object of the application A.

In this step, the process object of the application A obtained by the SC module is "1", and combined with descriptions about the process object in step B9, the SC module determines that the application A is hot-started according to content (1) of the obtained process object of the application A.

Step B20. The SC module obtains the status of the target Activity (the Activity1) from the ActivityRecord.

Step B21. The SC module obtains the status of the target Activity (the Activity1) from the ActivityRecord.

As mentioned above, the ActivityRecord stores the status of the Activity, and if a status of the Activity1 is not a destroyed status, it is determined that the Activity1 is not destroyed.

Step B22. The SC module determines that the Activity1 is not destroyed according to the obtained status of the target Activity (the Activity1).

Through step B16 to step B22, it may be determined that the application A meets the conditions corresponding to the above three determination steps (or all determination results are yes).

Step B23. After it is determined that the application A meets the conditions corresponding to the above three determination steps through the step B16 to step B22, information used for performing a display of a snapshot of the application A is sent to the ATMS.

Certainly, in a case that the application A does not meet the conditions corresponding to the above three determination steps (any one of the conditions is determined to be no), a process of starting the application A performs an original start logic set by the developer of the application A for the application A, and for the original start logic, reference may be specifically made to descriptions in the above embodiments.

Step B24. After receiving the information used for performing the display of the snapshot of the application A that is sent by the SC module, the ATMS sends information used for adding the snapshot of the application A to the ActivityRecord.

Step B25. After receiving the information used for adding the snapshot of the application A that is sent by the ATMS, the ActivityRecord sends the information used for adding the snapshot of the application A to the Snapshot.

Step B26. After receiving the information used for adding the snapshot of the application A, the Snapshot obtains the snapshot of the application A from the SnapshotCache. The snapshot is the snapshot of the application A stored in step B5.

Step B27. The Snapshot obtains the snapshot of the application A from the SnapshotCache.

In this embodiment of this application, the information transmitted in step B24 to step B26 may carry an identification of the application A and an identification of the Activity1, so that a snapshot corresponding to the Activity1 of the application A is obtained through the identification of the application A and the identification of the Activity1.

Step B28. After obtaining the snapshot of the application A from the SnapshotCache, the Snapshot sends the snapshot of the application A to a WMS.

Step B29. After successfully sending the snapshot of the application A to the WMS, the Snapshot sends a message used for indicating that the snapshot of the application A is successfully added to the ActivityRecord.

Step B30. After receiving the message used for indicating that the snapshot of the application A is successfully added that is sent by the Snapshot, the ActivityRecord sends the message used for indicating that the snapshot of the application A is successfully added to the ATMS.

Step B31. After receiving the message used for indicating that the snapshot of the application A is successfully added, the ATMS first sends an instruction to the Snapshot, where the instruction is used for instructing the Snapshot to execute an application start effect.

Step B32. After receiving the instruction used for instructing to execute the application start effect that is sent by the ATMS, the Snapshot sends an instruction of drawing a snapshot to the WMS.

Step B33. After receiving the instruction of drawing the snapshot sent by the Snapshot, the WMS draws the snapshot of the application A according to the previously received snapshot, and displays the snapshot of the application A after the drawing is successful.

It should be noted that, in this embodiment of this application, snapshot caching and transmission processes performed by the electronic device store related information of the snapshot, for example, a bitmap. When drawing the snapshot of the application A, the WMS draws the snapshot based on the related information of the previously received snapshot.

Certainly, the process of drawing and displaying is not completely that the WMS draws and displays, but the WMS realizes drawing, rendering, displaying, and other work by invoking other modules.

It should be noted that, the drawing of the snapshot of the application A also needs time. Therefore, after a start moment of hot starting shown in (c) of FIG. 7, a window in the electronic device maintains an original interface (the system desktop) in which the application A is located during the drawing of the snapshot of the application A. After the snapshot (a snapshot1) of the application A is obtained by drawing, the window of the electronic device displays the snapshot (the snapshot1) of the application A.

(a) of FIG. 7 is the snapshot of the application A displayed by the electronic device. It may be understood from a time (8:01) displayed at an upper right corner of an interface shown in (a) of FIG. 7 and a time (8:00) displayed at an upper right corner of an interface shown in (c) of FIG. 5A and FIG. 5B that, when the application returns from the foreground to the background, the saved snapshot of the application does not include a task bar (that is, is not a screenshot of the display screen of the electronic device), and the saved snapshot is a snapshot corresponding to content of the interface of the application A.

Step B34. After step B30 is performed, the ATMS also needs to send information of stopping the system desktop to the desktop launcher, so that the electronic device stops running the system desktop.

Step B35. After stopping running, the desktop launcher sends a message indicating that the system desktop has stopped running to the ATMS.

In this embodiment of this application, step B30 is performed after step B29, rather than step B30 is performed after step B33. This is because execution times of step B30 and step B31 are likely to be delayed when the system is busy or under heavy load. If the delay is after step B37, the system determines that the Activity1 has been obtained, and the steps of drawing and displaying the snapshot are not performed. Therefore, in this embodiment of this application, step B30 is set before step B32.

Step B36. After receiving the message indicating that a host interface of the system has stopped running that is sent by the desktop launcher, the ATMS sends a start message to the application A.

A process of subsequent steps is according to a process of starting the application set by the application A and specified by the system to start the application A. For details, reference may be made to step B35 to step B43. It should be noted that, step B35 to step B43 are only an example, and may also be a process of starting the application in other forms during specific implementation, which are not exemplified in this embodiment of this application.

Step B37. After the application A receives the start message, the process of the application A creates the Activity0.

Step B38. After the process of the application A creates the Activity0, the process of the application A resumes the Activity1.

Step B39. After resuming the Activity1, the process of the application A sends a message used for instructing to add an interface of the Activity1 to the ATMS, where the message may carry display parameters of the interface 1 corresponding to the Activity1.

Step B40. After receiving the message used for instructing to add the interface of the Activity1 that is sent by the application A, the ATMS sends the message used for instructing to add the interface corresponding to the Activity1 to the WMS. The message may also carry the display parameters of the interface 1 corresponding to the Activity1.

Step B41. After receiving the display parameters of the interface corresponding to the Activity1, the WMS returns a message that the adding is successful to the ATMS.

During specific implementations, the WMS receives the display parameters of the interface 1 corresponding to the Activity1, which indicates that the interface of the Activity1 is successfully added, and the WMS returns the message that the adding is successful to the ATMS.

Step B42. After receiving the message that the interface of the Activity1 is successfully added that is sent by the Snapshot, the ATMS returns the message that the interface of the Activity1 is successfully added to the application A.

Step B43. After receiving the message that the interface of the Activity1 is successfully added, the application A sends a message indicating that the resuming of the Activity1 is completed to the ATMS.

Step B44. After receiving the message indicating that the resuming of the Activity1 is completed that is sent by the application A, the ATMS sends an instruction to the WMS, where the instruction is used for instructing the WMS to execute a start effect.

Step B45. After receiving the instruction sent by the ATMS, the WMS draws and displays the interface 1 corresponding to the Activity1 based on the previously obtained display parameters of the interface of the Activity1.

After this step, the electronic device displays the interface 1 shown in (b) of FIG. 7. Because the electronic device may pre-display the snapshot1, during the display of the snapshot1, the Activity0 may be created and the Activity1 may be resumed, until the interface 1 corresponding to the Activity1 is obtained. Content of the interface 1 and content of the snapshot1 are the same. From the user's point of view, it is considered that the start response speed of the application A is faster, thereby improving the user experience.

This embodiment of this application is described by using the Activity0 being an advertising activity as an example. In actual applications, when it is determined whether a condition of creating an activity exists, there being a behavior of creating any one or more Activities is applicable to this embodiment of this application. That is, the created Activity0 is not necessarily limited to the advertising Activity, and may also be another Activity, such as a blank Activity (an Activity without an interface), or a white page Activity (an Activity displaying a white interface).

In this embodiment of this application, a developer of an application sets that a process of a snapshot is performed when the application is hot-started. However, to avoid a problem of poor user experience caused by inconsistency between content of an interface corresponding to the snapshot and content finally displayed after the application is started when a behavior of creating an Activity exists, a system of an electronic device sets a mechanism that the process of the snapshot does not take effect if the behavior of creating an Activity exists when the application is hot-started, that is, embodiments shown in FIG. 5A and FIG. 5B and FIG. 6. After the process of the snapshot takes no effect, from the user's point of view, the response speed of the application is relatively slow, which also causes poor user experience. This embodiment of this application can solve the problem that a conflict between application settings and system settings causes the user to think that the start response speed of the application is relatively slow. In a case that it is determined that three logic determination conditions provided by this embodiment of this application are met (or all are yes) when the application is started, the process of the snapshot is forced to be performed, so that from the user's point of view, the start response speed of the application is improved, and the user experience is improved.

Figure 13:
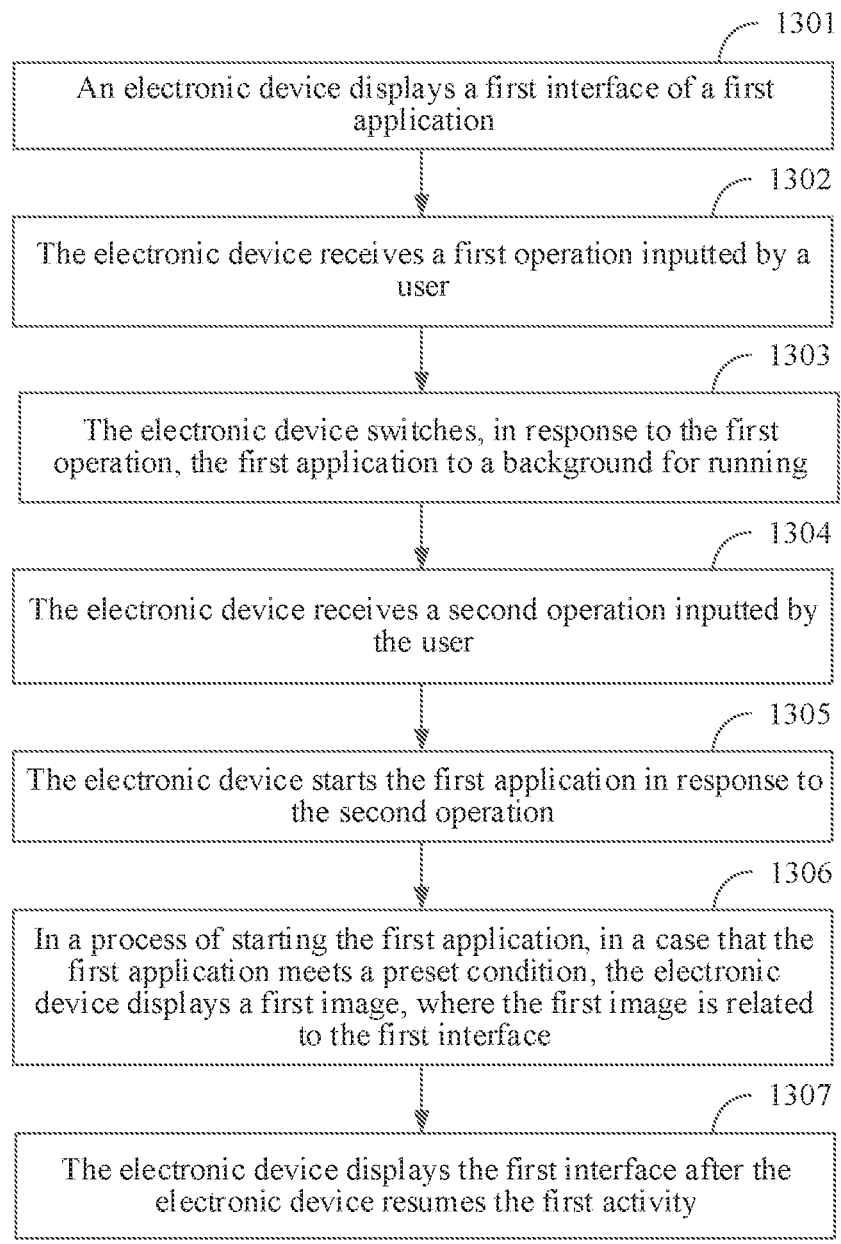
FIG. 13 is a schematic flowchart when an application is started according to an embodiment of this application.

As another embodiment, FIG. 13 is a schematic flowchart according to an embodiment of this application.

Step 1301. An electronic device displays a first interface of a first application.

The first application is any application software installed in the electronic device. The first interface is any interface displayed in a process in which the first application runs in a foreground.

Step 1302. The electronic device receives a first operation inputted by a user.

Step 1303. The electronic device switches, in response to the first operation, the first application to a background for running.

The first operation is any operation of switching the application to the background, for example, an operation of returning to a system desktop (a system host interface); an operation of invoking multi-task cards and clicking a task card of another application other than the first application in the multi-task cards; a click operation on an icon of another application other than the first application in a side navigation bar of the electronic device; or a click operation on a notification message of another application other than the first application on the top of the electronic device, and other operations are not further provided herein one by one by using examples.

Step 1304. The electronic device receives a second operation inputted by the user.

The second operation may be any operation of operations in step B13 and operations shown in FIG. 12.

Step 1305. The electronic device starts the first application in response to the second operation.

Step 1306. In a process of starting the first application, in a case that the first application meets a preset condition, the electronic device displays a first image, where the first image is related to the first interface. The preset condition includes the following: a process of the first application does not end, a first activity corresponding to the first interface is not destroyed, and a second activity needs to be created in a case that the first application is started.

If the process does not end, it indicates that the process still exists in the system. If the first activity corresponding to the first interface is not destroyed, it indicates that the first activity is not in a destroyed status. The second activity may be any activity other than the first activity, for example, may be the above advertising Activity, or may be a blank Activity (an Activity displaying an all-white interface), or may be a logo Activity of the application.

Step 1307. The electronic device displays the first interface after the electronic device resumes the first activity.

The first activity is a target Activity, and the first interface is an interface corresponding to the target Activity. The first interface is also a final interface displayed before the electronic device returns to the background.

In addition, before step 1303, the user may also perform another operation on the electronic device to open another application, and then return to the system desktop.

As an example, the electronic device receives a third operation inputted by the user; and the electronic device starts a second application in response to the third operation, and displays a second interface of the second application.

The third operation is any operation starting the second application, for example, clicking an icon of the second application on the system desktop.

Certainly, the operation may also be an operation of invoking the multi-task cards and clicking a task card of the second application in the multi-task cards, a click operation on an icon of the second application in the side navigation bar, or the like. The second interface of the second application may be a host interface of the second application, or may be an interface displayed before the second application returns to the background for running previously.

It should be understood that the order of the sequence numbers of the steps in the above method embodiments does not mean the order of execution, and the execution order of each process is determined by its function and inherent logic, and does not constitute any limitation on the implementation process of the embodiments of this application.

An embodiment of this application further provides a computer-readable storage medium, storing a computer program, the computer program, when executed by a processor, causing the processor to implement the steps according to the foregoing method embodiments.

An embodiment of this application further provides a computer program product, the computer program product, when run on a first device, causing the first device to implement the steps according to the foregoing method embodiments.

When the integrated unit is implemented in the form of a software functional unit and sold or used as an independent product, the integrated unit may be stored in a computer-readable storage medium. Based on such understanding, in this application, all or some of the processes of the methods in the embodiments may be implemented by a computer program instructing relevant hardware. The computer program may be stored in a computer-readable storage medium. During execution of the computer program by the processor, the steps of the foregoing method embodiments may be implemented. The computer program includes computer program code. The computer program code may be in source code form, object code form, executable file or some intermediate forms, or the like. The computer-readable medium may at least include: any entity or apparatus that can carry the computer program code to the first device, a recording medium, a computer memory, a read-only memory (ROM), a random access memory (RAM), an electric carrier signal, a telecommunication signal and a software distribution medium, or the like, for example, a U disk, a mobile hard disk, a magnetic disk, or a CD. In some jurisdictions, according to legislation and patent practice, the computer-readable medium is not an electric carrier signal and a telecommunication signal.

An embodiment of this application further provides a chip system, including a processor, the processor being coupled to a memory, and the processor being configured to run a computer program stored in the memory, to implement the steps according to any one of the method embodiments of this application. The chip system may be a single chip, or a chip module formed by a plurality of chips.

In the embodiments, descriptions of the embodiments have different emphases. As for parts that are not described in detail in one embodiment, reference can be made to the relevant descriptions of the other embodiments.

A person of ordinary skill in the art may notice that the exemplary units and method steps described with reference to the embodiments disclosed in this specification can be implemented in electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

The foregoing embodiments are merely intended for describing the technical solutions of this application, but not for limiting this application. Although this application is described in detail with reference to the foregoing embodiments, a person of ordinary skill in the art should understand that modifications may be still made to the technical solutions recorded in the foregoing embodiments or equivalent replacements may be made to some technical features thereof, and these modifications or replacements do not cause the essence of the corresponding technical solutions to depart from the scope of the technical solutions of the embodiments of this application.

What is claimed is:

1. An application starting method, the method comprising:
    displaying, by an electronic device, a first interface of a first application;
    receiving, by the electronic device, a first operation inputted by a user;
    switching, by the electronic device in response to the first operation, the first application to a background for running;
    receiving, by the electronic device, a second operation inputted by the user;
    starting, by the electronic device, the first application in response to the second operation;
    in a process of starting the first application, in a case that the first application meets a preset condition, displaying, by the electronic device, a first image, wherein the first image is related to the first interface, and the preset condition comprises the following: a process of the first application does not end, a first activity corresponding to the first interface is not destroyed, and a second activity needs to be created in a case that the first application is started; and
    displaying, by the electronic device, the first interface after the electronic device resumes the first activity.

2. The method according to claim 1, wherein after the receiving, by the electronic device, the first operation inputted by the user, the method further comprises:
    obtaining, by the electronic device, a second image based on the first interface; and
    caching, by the electronic device, the second image, wherein the second image comprises the first image.

3. The method according to claim 1, wherein before the displaying, by the electronic device, the first image, the method further comprises:
    determining, by the electronic device, that the process of the first application does not end;
    determining, by the electronic device, that the first activity corresponding to the first interface is not destroyed; and determining, by the electronic device, that the second activity needs to be created in a case that the first application is started.

4. The method according to claim 3, wherein the electronic device comprises a logic determination component and an activity task management component, and the activity task management component is configured to record a status of a process of an application; and
   wherein the determining, by the electronic device, that the process of the first application does not end comprises:
      obtaining, by the logic determination component, a status of the process of the first application from the activity task management component; and
      determining, by the logic determination component according to the status of the process of the first application, that the process of the first application does not end.

5. The method according to claim 4, wherein the electronic device comprises an activity recording component, and the activity recording component is configured to record a status of an activity; and
   wherein the determining, by the electronic device, that the first activity corresponding to the first interface is not destroyed comprises:
      obtaining, by the logic determination component, a status of the first activity from the activity recording component; and
      determining, by the logic determination component according to the status of the first activity, that the first activity is not destroyed.

6. The method according to claim 5, wherein the activity task management component is configured to send start information of the first application to the logic determination component in a case that the first application is started, and the start information of the first application comprises a target activity in a case that the first application is started; and
   wherein before the obtaining, by the logic determination component, a status of the first activity from the activity recording component, the method further comprises:
      receiving, by the logic determination component, the start information of the first application sent by the activity task management component; and
      determining, by the logic determination component according to the start information of the first application, that the target activity is the first activity in a case that the first application is started.

7. The method according to claim 6, wherein the activity task management component is configured to send the start information of the first application to the logic determination component in a case that the first application is started, and the start information of the first application comprises creating the second activity;
   wherein before the determining, by the electronic device, that the second activity needs to be created in a case that the first application is started, the method further comprises:
      receiving, by the logic determination component, the start information of the first application sent by the activity task management component; and
   wherein the determining, by the electronic device, that the second activity needs to be created in a case that the first application is started comprises:
      determining, by the logic determination component according to the start information of the first application, that the second activity needs to be created in a case that the first application is started.

8. The method according to claim 6, wherein the electronic device further comprises a desktop launcher;
   wherein the receiving, by the electronic device, the second operation inputted by the user comprises:
      receiving, by the desktop launcher, the second operation inputted by the user; and
   wherein the method further comprises:
      sending, by the desktop launcher in response to the second operation, a start instruction of the first application to the activity task management component;
      obtaining, by the activity task management component in response to receiving the start instruction, the start information of the first application; and
      sending, by the activity task management component, the start information of the first application to the logic determination component.

9. The method according to claim 2, wherein the electronic device comprises: an activity task management component, a logic determination component, a snapshot module, and a drawing service;
   wherein the caching, by the electronic device, the second image comprises:
      caching, by the snapshot module, the second image; and
   wherein the in a case that the first application meets the preset condition, displaying, by the electronic device, a first image comprises:
      in a case that the logic determination component determines that the first application meets the preset condition, sending, by the logic determination component, first information to the activity task management component, wherein the first information is used for indicating that the first application meets the preset condition;
      in a case that the first information is received, sending, by the activity task management component, second information to the snapshot module, wherein the second information is used for instructing the snapshot module to send the second image to the drawing service;
      sending, by the snapshot module, the second image to the drawing service; and
      controlling, by the drawing service, the electronic device to display the first image based on the second image.

10. The method according to claim 9, wherein the electronic device comprises: an activity recording component; and
    wherein the sending, by the activity task management component, the second information to the snapshot module comprises:
       sending, by the activity task management component, the second information to the snapshot module by using the activity recording component.

11. The method according to claim 9,
    wherein the first image is same as the second image, and the first image is same as an image of the first interface; or
    wherein the first image is same as the image of the first interface, the second image comprises the image of the first interface and first status bar content, and the first status bar content is status bar content of the electronic device in a case that the electronic device caches the second image.

12. The method according to claim 9, wherein after the sending, by the snapshot module, the second image to the drawing service, the method further comprises:
- sending, by the snapshot module, information that the second image is successfully added to the activity task management component; and
- in response to receiving the information that the second image is successfully added, sending, by the activity task management component, a first instruction to the drawing service by using the snapshot module, wherein the first instruction is used for instructing the drawing service to control the electronic device to display the first image based on the second image.

13. The method according to claim 12, wherein the electronic device comprises an activity recording component; and
- wherein the sending, by the snapshot module, information that the second image is successfully added to the activity task management component comprises:
  - sending, by the snapshot module, the information that the second image is successfully added to the activity task management component by using the activity recording component.

14. The method according to claim 12, wherein the second operation is an operation acting on an icon of the first application displayed on a system desktop of the electronic device, and the electronic device further comprises a desktop launcher; and
- wherein after the sending, by the activity task management component, the first instruction to the drawing service by using the snapshot module, the method further comprises:
  - sending, by the activity task management component, third information to the desktop launcher, wherein the third information is used for instructing the desktop launcher to stop displaying the system desktop.

15. The method according to claim 9,
- wherein the caching, by the snapshot module, the second image comprises:
  - caching, by the snapshot module, the second image in a snapshot cache file; and
- wherein the sending, by the snapshot module, the second image to the drawing service comprises:
  - obtaining, by the snapshot module, the second image from the snapshot cache file; and
  - sending, by the snapshot module, the second image to the drawing service.

16. The method according to claim 1, wherein before the receiving, by the electronic device, the second operation inputted by the user, the method further comprises:
- receiving, by the electronic device, a third operation inputted by the user; and
- starting, by the electronic device, a second application in response to the third operation, and displaying a second interface of the second application.

17. The method according to claim 1, wherein before the electronic device resumes the first activity, the method further comprises:
- creating, by the electronic device, the second activity.

18. The method according to claim 1, wherein the first operation comprises:
- a gesture operation on a touch screen of the electronic device; or
- an air gesture operation within a field of view of a camera of the electronic device.

19. An electronic device, comprising:
- a memory storing a computer program; and
- a processor, wherein the processor is configured to run the computer program stored in the memory to cause the electronic device to implement operations comprising:
  - displaying a first interface of a first application;
  - receiving a first operation inputted by a user;
  - switching, in response to the first operation, the first application to a background for running;
  - receiving a second operation inputted by the user;
  - starting the first application in response to the second operation;
  - in a process of starting the first application, in a case that the first application meets a preset condition, displaying a first image, wherein the first image is related to the first interface, and the preset condition comprises the following: a process of the first application does not end, a first activity corresponding to the first interface is not destroyed, and a second activity needs to be created in a case that the first application is started; and
  - displaying the first interface after the electronic device resumes the first activity.

20. A non-transitory computer-readable storage medium storing a computer program that, when run on a processor, causes an electronic device to implement operations comprising:
- displaying a first interface of a first application;
- receiving a first operation inputted by a user;
- switching, in response to the first operation, the first application to a background for running;
- receiving a second operation inputted by the user;
- starting the first application in response to the second operation;
- in a process of starting the first application, in a case that the first application meets a preset condition, displaying a first image, wherein the first image is related to the first interface, and the preset condition comprises the following: a process of the first application does not end, a first activity corresponding to the first interface is not destroyed, and a second activity needs to be created in a case that the first application is started; and
- displaying the first interface after the electronic device resumes the first activity.

* * * * *

UNITED STATES PATENT AND TRADEMARK OFFICE
CERTIFICATE OF CORRECTION

PATENT NO. : 12,197,924 B2
APPLICATION NO. : 18/034560
DATED : January 14, 2025
INVENTOR(S) : Jiwei Xiao Page 1 of 1

It is certified that error appears in the above-identified patent and that said Letters Patent is hereby corrected as shown below:

On the Title Page

Item (57), Line 12: "anew activity needs to be created when the application is" should read -- a new activity needs to be created when the application is --.

Signed and Sealed this
Fourth Day of March, 2025

Coke Morgan Stewart
*Acting Director of the United States Patent and Trademark Office*